United States Patent
Yang et al.

(10) Patent No.: US 10,959,250 B2
(45) Date of Patent: *Mar. 23, 2021

(54) FEEDBACK FOR MULTI-POINT COMMUNICATIONS

(71) Applicant: QUALCOMM INCORPORATED, San Diego, CA (US)

(72) Inventors: Wei Yang, San Diego, CA (US); Yi Huang, San Diego, CA (US); Joseph Binamira Soriaga, San Diego, CA (US); Gokul Sridharan, Sunnyvale, CA (US); Jay Kumar Sundararajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/805,483

(22) Filed: Feb. 28, 2020

(65) Prior Publication Data

US 2020/0205175 A1    Jun. 25, 2020

Related U.S. Application Data

(63) Continuation of application No. 16/460,064, filed on Jul. 2, 2019.

(Continued)

(51) Int. Cl.
*H04W 72/14*   (2009.01)
*H04W 72/12*   (2009.01)
*H04W 76/11*   (2018.01)
*H04L 5/00*    (2006.01)
*H04W 24/08*   (2009.01)

(Continued)

(52) U.S. Cl.
CPC ....... *H04W 72/1242* (2013.01); *H04L 5/0082* (2013.01); *H04W 24/08* (2013.01);

(Continued)

(58) Field of Classification Search
CPC ....................................................... H04L 12/28

(Continued)

(56) References Cited

U.S. PATENT DOCUMENTS

2016/0330011 A1*  11/2016  Lee .................. H04L 5/1461
2019/0124598 A1*   4/2019  Fakoorian .......... H04L 5/0035
2020/0015250 A1    1/2020  Yang et al.

OTHER PUBLICATIONS

Huawei et al: "Enabling Multiple NR-PDCCH for Multiple TRP Transmission", 3GPPDRAFT; R1-1715462, 3rd Generation Partnership Project (3GPP), Mobilecompetence Centre; 650, Route Des Lucioles; F-06921 Sophia-Antipolis Cedex;France, vol. RAN WG1, no. Nagoya, Japan; Sep. 18, 2017-Sep. 21, 2017, Sep. 9, 2017, XP051328984, 3 Pages, Retrieved from the Internet: URL: http://www.3gpp.org/ftp/tsg_ran/WG1_RL1/TSGR1_AH/NR_AH_1709/Docs/ [retrieved on Sep. 9, 2017] p. 2-p. 3.

(Continued)

*Primary Examiner* — Dang T Ton
(74) *Attorney, Agent, or Firm* — Holland & Hart LLP

(57) ABSTRACT

Methods, systems, and devices for wireless communications are described. A wireless device, such as a user equipment (UE), may receive, via a first control resource set (CORESET) of a plurality of CORESETs monitored by the UE, a first downlink grant that schedules a downlink data transmission to the UE. The UE may receive the downlink data transmission from a first transmission reception point (TRP) of a plurality of TRPs and transmit feedback information for the downlink data transmission to the first TRP based at least in part on the first TRP being associated with the first CORESET or the first downlink grant being received via the first CORESET.

30 Claims, 18 Drawing Sheets

Related U.S. Application Data

(60) Provisional application No. 62/694,962, filed on Jul. 6, 2018.

(51) Int. Cl.
*H04W 52/06* (2009.01)
*H04W 72/04* (2009.01)

(52) U.S. Cl.
CPC .......... *H04W 52/06* (2013.01); *H04W 72/042* (2013.01); *H04W 72/14* (2013.01); *H04W 76/11* (2018.02)

(58) Field of Classification Search
USPC .......................................................... 370/329
See application file for complete search history.

(56) References Cited

OTHER PUBLICATIONS

Huawei et al: "Solution and TP for Multi-TRP PDCCH Transmission," 3GPP Drat;R1-1800824, 3rd Generation Partnership Project (3GPP), Mobile Competencecentre; 650, Route Des Lucioles; F-06921 Sophia-Antipolis Cedex; France, vol. RAN WG1, no. Vancouver, Canada; Jan. 22, 2018-Jan. 26, 2018, Jan. 13, 2018,XP051385096, 5 pages, Retrieved from the Internet: URL: http://www.3gpp.org/ftp/tsg%5Fran/WG1%5FRL1/TSGR1%5FAH/NR%5FAH%5F1801/Docs/[retrieved on Jan. 13, 2018] p. 3.

Internationalsearch Report and Written Opinion - PCT/US2019/040523—ISA/EPO—Oct. 28, 2019.

Nokia Etal: "Remaining Details on Multi-TRP Transmission," 3GPP Draft; R1-1716494, 3rd Generationpartnership Project (3GPP), Mobile Competence Centre; 650, Route Deslucioles; F-06921 Sophia-Antipolis Cedex; France, vol. RAN WG1, no. Nagoya, Japan; Sep. 18, 2017-Sep. 21-, 2017, Sep. 17, 2017, XP051339947, 6 Pages, Retrieved from the Internet: URL: http://www.3gpp.org/ftp/Meetings_3GPP_SYNC/RAN1/Docs/ [retrieved onSep. 17, 2017] p. 3-p. 4.

Samsung: "HARQ Management and Feedback," 3GPP Draft; R1-1716005, 3rd Generationpartnership Project (3GPP), Mobile Competence Centre; 650, Route Deslucioles; F-06921 Sophia-Antipolis Cedex; France, vol. RAN WG1, no. Nagoya, Japan; Sep. 18, 2017-Sep. 21, 2017, Sep. 17, 2017, XP051339464, 10 pages, Retrieved from the Internet: URL: http://www.3gpp.org/ftp/Meetings_3GPP_SYNC/RAN1/Docs/ [retrieved onSep. 17, 2017] p. 7.

\* cited by examiner

Downlink channel 215-a

PUCCH 220-a

Downlink channel 215-b

PUCCH 220-b

(12) United States Patent
US 10,959,250 B2

FEEDBACK FOR MULTI-POINT COMMUNICATIONS

CROSS REFERENCE

The present Application for Patent is a Continuation of U.S. patent application Ser. No. 16/460,064 by YANG et al., entitled "FEEDBACK FOR MULTI-POINT COMMUNICATIONS" filed Jul. 2, 2019, which claims the benefit of U.S. Provisional Patent Application No. 62/694,962 by YANG et al., entitled "FEEDBACK FOR MULTI-POINT COMMUNICATIONS," filed Jul. 6, 2018, assigned to the assignee hereof, and expressly incorporated herein.

BACKGROUND

The following relates generally to wireless communications, and more specifically to multi-point communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a UE may communicate with two or more base stations (e.g., two or more transmission reception points (TRPs)) over time and frequency resources dedicated for communications between the TRPs and the UE. The TRPs may coordinate (e.g., dynamically or semi-statically) communications to the UE over backhaul links, which may be subject to delay due to changing channel conditions or backhaul throughput limitations. In some instances, such as while operating under non-ideal backhaul conditions, each TRP may send signaling to the UE, which may cause latency and increase signaling overhead.

SUMMARY

Generally, the described techniques relate to improved methods, systems, devices, or apparatus that support feedback for multi-point communications. The described techniques may enable a user equipment (UE) to determine to which transmission reception point (TRP) in a set of TRPs to transmit feedback for a received downlink data transmission based on a scheduling control resource set (CORESET) or an indicator received in a grant. In some cases, a set of TRPs may coordinate communication with a UE, and may transmit one or more downlink grants that schedule a downlink data transmission to the UE from one or more TRPs of the set, for example.

In some cases, two or more TRPs may semi-statically coordinate (e.g., at a Radio Resource Control (RRC) level) transmissions to the same UE using a non-coherent joint transmission (NCJT) scheme. In such cases, the TRPs may send separate downlink transmissions (e.g., physical downlink control channel (PDCCH) or physical downlink shared channel (PDSCH)) to the same UE according to an RRC configuration. In some aspects, the PDCCH transmissions from different TRPs may be in different CORESETs within the same time interval (e.g., slot, mini-slot), and PDSCH transmissions may be in the same or a different slot. In some cases, a UE may determine to transmit feedback (e.g., acknowledgement (ACK) feedback or negative ACK (NACK) feedback) in response to a downlink transmission and may determine to which TRP an ACK/NACK is targeted as a UE may multiplex multiple ACK/NACKs (e.g., for downlink transmissions from one or more TRPs) in a single physical uplink control channel (PUCCH) transmission. For example, based on backhaul conditions (e.g., backhaul latency with respect to a threshold) between the TRPs, feedback for a downlink transmission may be considered to be timely when the feedback transmitted by the UE (e.g., to a TRP that transmitted the downlink transmission) meets given timing constraints (e.g., related to whether the TRP is to retransmit the downlink transmission to the UE). In some cases, exchanging such feedback via a non-ideal backhaul (e.g., backhaul latency exceeds a threshold) may not be considered timely as the feedback may be received at the transmitting TRP via an intermediary TRP (e.g., via backhaul) and may fail to meet the given timing constraints. In such cases, the UE may target feedback to a particular TRP in an attempt to meet the given timing constraints (e.g., the UE may target feedback for a downlink transmission to the TRP that transmitted the downlink transmission to the UE).

In some cases, the UE may identify a TRP to which the UE may transmit ACK/NACK feedback information corresponding to a received downlink data transmission (e.g., a PDSCH transmission). The downlink data transmission may be based on a CORESET associated with a TRP that was used to schedule the downlink data transmission, or a TRP identifier (ID) included in a first downlink grant used to schedule the downlink data transmission. In some examples, the UE may transmit feedback information for the received downlink data transmission and direct the feedback information toward the transmitting TRP (e.g., based on the CORESET or TRP ID). The techniques described herein may enable a UE to determine to which TRP of a set of TRPs the UE is to target feedback for a received downlink data transmission in a non-ideal backhaul environment.

A method of wireless communications at a UE is described. The method may include receiving, via a first CORESET of a set of CORESETs monitored by the UE, a first downlink grant that schedules a downlink data transmission to the UE, receiving the downlink data transmission from a first TRP of a set of TRPs, and transmitting feedback information for the downlink data transmission to the first TRP based on the first TRP being associated with the first CORESET or the first downlink grant being received via the first CORESET.

An apparatus for wireless communications at a UE is described. The apparatus may include a processor, memory in electronic communication with the processor, and instructions stored in the memory. The instructions may be executable by the processor to cause the apparatus to receive, via a first CORESET of a set of CORESETs monitored by the UE, a first downlink grant that schedules a downlink data transmission to the UE, receive the downlink data transmission from a first TRP of a set of TRPs, and transmit feedback information for the downlink data transmission to the first TRP based on the first TRP being associated with the first CORESET or the first downlink grant being received via the first CORESET.

Another apparatus for wireless communications at a UE is described. The apparatus may include means for receiving, via a first CORESET of a set of CORESETs monitored by the UE, a first downlink grant that schedules a downlink data transmission to the UE, receiving the downlink data transmission from a first TRP of a set of TRPs, and transmitting feedback information for the downlink data transmission to the first TRP based on the first TRP being associated with the first CORESET or the first downlink grant being received via the first CORESET.

A non-transitory computer-readable medium storing code for wireless communications at a UE is described. The code may include instructions executable by a processor to receive, via a first CORESET of a set of CORESETs monitored by the UE, a first downlink grant that schedules a downlink data transmission to the UE, receive the downlink data transmission from a first TRP of a set of TRPs, and transmit feedback information for the downlink data transmission to the first TRP based on the first TRP being associated with the first CORESET or the first downlink grant being received via the first CORESET.

Some examples of the method, apparatuses, and non-transitory computer-readable medium described herein may further include operations, features, means, or instructions for receiving a configuration message configuring the UE to monitor the set of CORESETs, where the set of CORESETs may be associated with the set of TRPs for coordinating communication with the UE, and where the configuration message indicates that the first TRP may be associated with the first CORESET.

Some examples of the method, apparatuses, and non-transitory computer-readable medium described herein may further include operations, features, means, or instructions for receiving, via the first downlink grant, an indication of a number of feedback messages to multiplex in the feedback information, where the indication may be conveyed via a downlink assignment index (DAI) field in downlink control information (DCI).

In some examples of the method, apparatuses, and non-transitory computer-readable medium described herein, transmitting the feedback information may include operations, features, means, or instructions for transmitting a multiplexed set of feedback messages associated with multiple communications between the first TRP and the UE, where the multiplexed set of feedback messages includes the feedback information for the downlink data transmission.

Some examples of the method, apparatuses, and non-transitory computer-readable medium described herein may further include operations, features, means, or instructions for receiving an indication of a TRP ID associated with the first TRP via a TRP indicator field in DCI of the first downlink grant.

Some examples of the method, apparatuses, and non-transitory computer-readable medium described herein may further include operations, features, means, or instructions for receiving an indication of a TRP ID associated with the first TRP via a TRP indicator field in DCI of a first uplink grant, where the first uplink grant schedules an uplink transmission from the UE to the first TRP.

Some examples of the method, apparatuses, and non-transitory computer-readable medium described herein may further include operations, features, means, or instructions for receiving an indication of a TRP ID associated with the first TRP via the first CORESET, where a CORESET ID associated with the first CORESET indicates the TRP ID.

Some examples of the method, apparatuses, and non-transitory computer-readable medium described herein may further include operations, features, means, or instructions for receiving an indication of a TRP ID associated with the first TRP via the first CORESET, where the first CORESET corresponds to the first TRP.

In some examples of the method, apparatuses, and non-transitory computer-readable medium described herein two CORESETs of the set of control resources sets may be associated with one TRP of the set of TRPs.

In some examples of the method, apparatuses, and non-transitory computer-readable medium described herein, the first CORESET corresponds to multiple TRPs of the set of TRPs.

In some examples of the method, apparatuses, and non-transitory computer-readable medium described herein, the first CORESET may be configured in a first cell supported by the first TRP.

In some examples of the method, apparatuses, and non-transitory computer-readable medium described herein, the first CORESET may be associated with a second CORESET supported by a second cell of the first TRP.

In some examples of the method, apparatuses, and non-transitory computer-readable medium described herein, each of the set of CORESETs may be quasi co-located with a downlink reference signal (RS) transmitted from one TRP of the set of TRPs.

Some examples of the method, apparatuses, and non-transitory computer-readable medium described herein may further include operations, features, means, or instructions for determining an uplink control channel configuration for communication with the first TRP and a second TRP of the set of TRPs, where the uplink control channel configuration specifies a first PUCCH configuration for the first TRP and a second PUCCH configuration for the second TRP.

In some examples of the method, apparatuses, and non-transitory computer-readable medium described herein, the first PUCCH configuration identifies a first power control loop, and the second PUCCH configuration identifies a second power control loop that may be different from the first PUCCH configuration.

Some examples of the method, apparatuses, and non-transitory computer-readable medium described herein may further include operations, features, means, or instructions for transmitting the feedback information for the downlink data transmission to the first TRP in accordance with the first power control loop and transmitting second feedback information for a second downlink data transmission to a second TRP in accordance with the second power control loop.

Some examples of the method, apparatuses, and non-transitory computer-readable medium described herein may further include operations, features, means, or instructions for transmitting feedback information for the downlink data transmission to the first TRP via resources associated with the first PUCCH configuration, receiving a second downlink data transmission from a second TRP of the set of TRPs and transmitting feedback information for the second downlink data transmission to the second TRP via resources associated with the second PUCCH configuration.

In some examples of the method, apparatuses, and non-transitory computer-readable medium described herein, the resources associated with the first PUCCH configuration may be quasi co-located with a first downlink RS from the first TRP and the resources associated with the second PUCCH configuration may be quasi co-located with a second downlink RS from the second TRP.

Some examples of the method, apparatuses, and non-transitory computer-readable medium described herein may further include operations, features, means, or instructions for determining an uplink control channel configuration for communication with the first TRP and a second TRP of the set of TRPs, where the uplink control channel configuration specifies a single PUCCH configuration for both the first TRP and the second TRP.

Some examples of the method, apparatuses, and non-transitory computer-readable medium described herein may further include operations, features, means, or instructions for transmitting feedback information for the downlink data transmission to the first TRP via a first subset of resources of the single PUCCH configuration and transmitting feedback information for a second downlink data transmission to the second TRP via a second subset of resources of the single PUCCH configuration, where the second subset of resources may be non-overlapping with the first subset of resources.

In some examples of the method, apparatuses, and non-transitory computer-readable medium described herein, each PUCCH resource of the single PUCCH configuration may be associated with a respective quasi co-location configuration.

In some examples of the method, apparatuses, and non-transitory computer-readable medium described herein, each quasi co-location configuration identifies a reference signal associated with one of the first TRP or the second TRP.

In some examples of the method, apparatuses, and non-transitory computer-readable medium described herein, each quasi co-location configuration corresponds to a power control loop index associated with one of the first TRP or the second TRP.

Some examples of the method, apparatuses, and non-transitory computer-readable medium described herein may further include operations, features, means, or instructions for determining a first PUCCH configuration for the first TRP and a second PUCCH configuration for a second TRP of the set of TRPs, where the first PUCCH configuration configures PUCCH resources in a first set of time intervals, and the second PUCCH configuration configures PUCCH resources in a second set of time intervals that may be nonoverlapping with the first set of time intervals.

In some examples of the method, apparatuses, and non-transitory computer-readable medium described herein, each of the first set of time intervals and each of the second set of time intervals may be a slot or a mini-slot.

Some examples of the method, apparatuses, and non-transitory computer-readable medium described herein may further include operations, features, means, or instructions for receiving, via a second CORESET of the set of CORESETs monitored by the UE, a second downlink grant that schedules a second downlink data transmission to the UE, receiving the second downlink data transmission from a second TRP of the set of TRPs and transmitting feedback information for the second downlink data transmission to the second TRP based on the second TRP being associated with the second CORESET or the second downlink grant indicating the second TRP.

In some examples of the method, apparatuses, and non-transitory computer-readable medium described herein, the feedback information for the downlink data transmission may be transmitted via a first PUCCH to the first TRP according to a DAI associated with the first downlink grant and the feedback information for the second downlink data transmission may be transmitted via a second PUCCH to the second TRP according to a DAI associated with the second downlink grant.

Some examples of the method, apparatuses, and non-transitory computer-readable medium described herein may further include operations, features, means, or instructions for receiving, from the first TRP, an indication of a feedback timing and feedback resource indicator for the first PUCCH and receiving, from the second TRP, an indication of a feedback timing and feedback resource indicator for the second PUCCH.

In some examples of the method, apparatuses, and non-transitory computer-readable medium described herein, the feedback information for the data transmission may be transmitted according to a power control loop different from the feedback information for the second data transmission.

Some examples of the method, apparatuses, and non-transitory computer-readable medium described herein may further include operations, features, means, or instructions for transmitting the feedback information for the data transmission to the first TRP via an uplink shared channel communication associated with the first TRP.

Some examples of the method, apparatuses, and non-transitory computer-readable medium described herein may further include operations, features, means, or instructions for transmitting, via an uplink control channel, a multiplexed set of uplink control messages associated with multiple communications between the first TRP and the UE, where the multiplexed set of uplink control messages includes the feedback information for the downlink data transmission, channel state information (CSI) feedback, a scheduling request (SR), or a combination thereof.

Some examples of the method, apparatuses, and non-transitory computer-readable medium described herein may further include operations, features, means, or instructions for determining whether to drop at least a portion of the feedback information for the data transmission or the feedback information for the second data transmission based on a set of priority rules, where the set of priority rules may be based on an uplink control information type, a TRP priority, or a starting symbol associated with transmission of the feedback information for the data transmission or the second data transmission.

A method of wireless communications at a first TRP of a set of TRPs is described. The method may include transmitting, via a first CORESET of a set of CORESETs associated with the set of TRPs for coordinating communication with a UE, a first downlink grant that schedules a downlink data transmission to the UE and receiving feedback information for the downlink data transmission from the UE based on the first TRP being associated with the first CORESET or the first downlink grant being transmitted via the first CORESET.

An apparatus for wireless communications at a first TRP of a set of TRPs is described. The apparatus may include a processor, memory in electronic communication with the processor, and instructions stored in the memory. The instructions may be executable by the processor to cause the apparatus to transmit, via a first CORESET of a set of CORESETs associated with the set of TRPs for coordinating communication with a UE, a first downlink grant that schedules a downlink data transmission to the UE and receive feedback information for the downlink data transmission from the UE based on the first TRP being associated with the first CORESET or the first downlink grant being transmitted via the first CORESET.

Another apparatus for wireless communications at a first TRP of a set of TRPs is described. The apparatus may include means for transmitting, via a first CORESET of a set of CORESETs associated with the set of TRPs for coordinating communication with a UE, a first downlink grant that schedules a downlink data transmission to the UE and receiving feedback information for the downlink data transmission from the UE based on the first TRP being associated with the first CORESET or the first downlink grant being transmitted via the first CORESET.

A non-transitory computer-readable medium storing code for wireless communications at a first TRP of a set of TRPs is described. The code may include instructions executable by a processor to transmit, via a first CORESET of a set of CORESETs associated with the set of TRPs for coordinating communication with a UE, a first downlink grant that schedules a downlink data transmission to the UE and receive feedback information for the downlink data transmission from the UE based on the first TRP being associated with the first CORESET or the first downlink grant being transmitted via the first CORESET.

Some examples of the method, apparatuses, and non-transitory computer-readable medium described herein may further include operations, features, means, or instructions for transmitting a configuration message configuring the UE to monitor the set of CORESETs, where the configuration message indicates that the first TRP may be associated with the first CORESET.

Some examples of the method, apparatuses, and non-transitory computer-readable medium described herein may further include operations, features, means, or instructions for transmitting an indication of a TRP ID associated with the first TRP via a TRP indicator field in DCI of the first downlink grant.

In some examples of the method, apparatuses, and non-transitory computer-readable medium described herein, receiving the feedback information may include operations, features, means, or instructions for transmitting an indication of a TRP ID associated with the first TRP via a TRP indicator field in DCI of a first uplink grant, where the first uplink grant schedules an uplink transmission from the UE to the first TRP.

Some examples of the method, apparatuses, and non-transitory computer-readable medium described herein may further include operations, features, means, or instructions for transmitting an indication of a TRP ID associated with the first TRP via the first CORESET, where a CORESET ID associated with the first CORESET indicates the TRP ID.

Some examples of the method, apparatuses, and non-transitory computer-readable medium described herein may further include operations, features, means, or instructions for transmitting an indication of a TRP ID associated with the first TRP via the first CORESET, where the first CORESET corresponds to the first TRP.

Some examples of the method, apparatuses, and non-transitory computer-readable medium described herein may further include operations, features, means, or instructions, where two CORESETs of the set of control resources sets may be associated with one TRP of the set of TRPs.

In some examples of the method, apparatuses, and non-transitory computer-readable medium described herein, the first CORESET corresponds to multiple TRPs of the set of TRPs.

In some examples of the method, apparatuses, and non-transitory computer-readable medium described herein, the first CORESET may be configured in a first cell supported by the first TRP.

In some examples of the method, apparatuses, and non-transitory computer-readable medium described herein, the first CORESET may be associated with a second CORESET supported by a second cell of the first TRP.

In some examples of the method, apparatuses, and non-transitory computer-readable medium described herein, each of the set of CORESETs may be quasi co-located with a downlink RS transmitted from one TRP of the set of TRPs.

Some examples of the method, apparatuses, and non-transitory computer-readable medium described herein may further include operations, features, means, or instructions for configuring the UE according to an uplink control channel configuration for communication with the first TRP and a second TRP of the set of TRPs, where the uplink control channel configuration specifies a first PUCCH configuration for the first TRP and a second PUCCH configuration for the second TRP.

In some examples of the method, apparatuses, and non-transitory computer-readable medium described herein, the first PUCCH configuration identifies a first power control loop, and the second PUCCH configuration identifies a second power control loop that may be different from the first PUCCH configuration.

In some examples of the method, apparatuses, and non-transitory computer-readable medium described herein, the first PUCCH configuration may be associated with a quasi co-location configuration different from the second PUCCH configuration.

In some examples of the method, apparatuses, and non-transitory computer-readable medium described herein, the first PUCCH configuration may be associated with a power control loop different from the second PUCCH configuration.

Some examples of the method, apparatuses, and non-transitory computer-readable medium described herein may further include operations, features, means, or instructions for configuring the UE with a first PUCCH configuration for the first TRP and a second PUCCH configuration for a second TRP of the set of TRPs, where the first PUCCH configuration configures PUCCH resources in a first set of time intervals, and the second PUCCH configuration configures PUCCH resources in a second set of time intervals that may be nonoverlapping with the first set of time intervals.

In some examples of the method, apparatuses, and non-transitory computer-readable medium described herein, each of the first set of time intervals and each of the second set of time intervals may be a slot or a mini-slot.

Some examples of the method, apparatuses, and non-transitory computer-readable medium described herein may further include operations, features, means, or instructions for configuring the UE according to an uplink control channel configuration for communication with the first TRP and a second TRP of the set of TRPs, where the uplink control channel configuration specifies a single PUCCH configuration for both the first TRP and the second TRP.

In some examples of the method, apparatuses, and non-transitory computer-readable medium described herein, each PUCCH resource of the single PUCCH configuration may be associated with a respective quasi co-location configuration.

Some examples of the method, apparatuses, and non-transitory computer-readable medium described herein may further include operations, features, means, or instructions for determining a subset of resources of the single PUCCH configuration for the first transmission based on coordination between the first TRP and the second TRP.

Some examples of the method, apparatuses, and non-transitory computer-readable medium described herein may further include operations, features, means, or instructions for transmitting, via the first downlink grant, an indication of a number of feedback messages to multiplex in the feedback information, where the indication may be conveyed via a DAI field in DCI.

Some examples of the method, apparatuses, and non-transitory computer-readable medium described herein may further include operations, features, means, or instructions for receiving a multiplexed set of feedback messages associated with multiple communications between the first TRP and the UE, where the multiplexed set of feedback messages includes the feedback information for the data transmission.

Some examples of the method, apparatuses, and non-transitory computer-readable medium described herein may further include operations, features, means, or instructions for receiving a multiplexed set of feedback messages associated with multiple communications between the first TRP and the UE, where the multiplexed set of feedback messages includes the feedback information for the data transmission.

Some examples of the method, apparatuses, and non-transitory computer-readable medium described herein may further include operations, features, means, or instructions for receiving a multiplexed set of uplink control messages associated with multiple communications between the first TRP and the UE, where the multiplexed set of uplink control messages includes the feedback information for the downlink data transmission, CSI feedback, SR, or a combination thereof.

DETAILED DESCRIPTION

Figure 1:
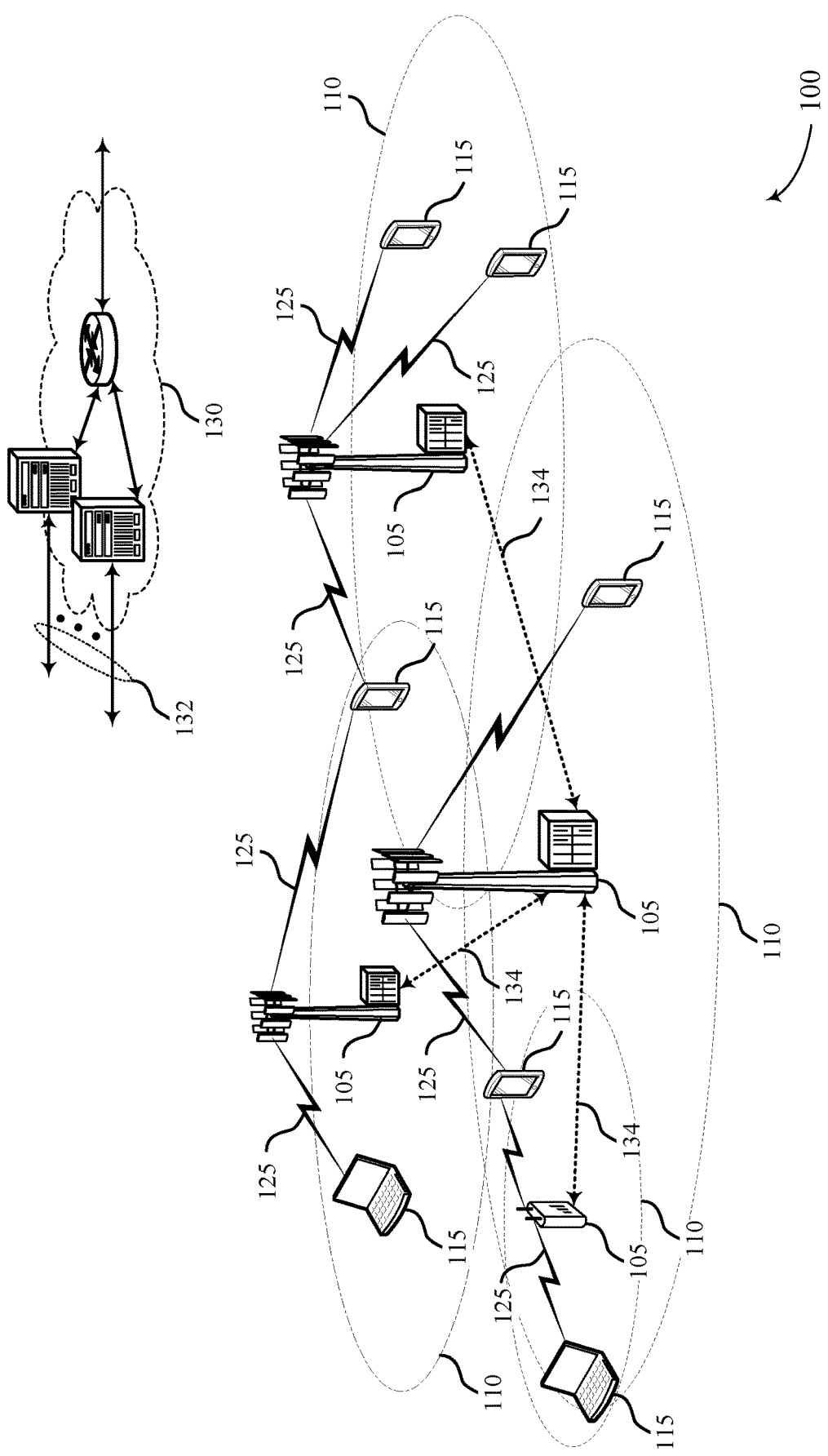
FIGS. 1 and 2 illustrate examples of wireless communications systems that support feedback for multi-point communications in accordance with aspects of the present disclosure.

The described techniques may relate to a set of transmission reception points (TRPs) coordinating communication with a user equipment (UE). Such techniques may enable the UE to determine to which TRP in the set of TRPs to transmit feedback for a received downlink data transmission. The determination may be based on a scheduling CORESET or an indicator within a grant. In some cases, such as in New Radio (NR), multiple TRPs supported communications for the same UE. For instance, multiple TRPs may communicate with the same UE at the same (or different) time in a non-coherent manner, which may be referred to as non-coherent joint transmission (NCJT). In some cases, multiple TRPs may be able to transmit downlink transmissions, such as a physical downlink control channel (PDCCH) or a physical downlink shared channel (PDSCH), to the UE. The downlink transmissions may be based in part on a Radio Resource Control (RRC) configuration. For instance, two TRPs communicating with a UE may semi-statically coordinate communications (e.g., with respect to PDSCH, PDCCH, physical uplink control channel (PUCCH), physical uplink shared channel (PUSCH), reference signal (RS) configurations) at an RRC level, due to non-ideal backhaul conditions (e.g., latency over backhaul). In some aspects, in non-ideal backhaul conditions, each TRP may send a separate PDCCH or PDSCH. In some cases, the PDCCH for each TRP may be in different CORESETs within the same slot, while the PDSCH for the TRPs may be in the same slot.

A wireless device, such as a UE, may use multiplexing techniques to multiplex feedback messages (e.g., one or more acknowledgement (ACK) feedback messages or negative ACK (NACK) feedback messages, each of which may be an example of a hybrid automatic repeat request (HARD) ACK (HARQ-ACK) feedback message) corresponding to PDSCHs in multiple slots or component carriers (CCs). In some cases, the UE may determine the recipient TRP of the ACK/NACKs in order to multiplex ACK/NACKs in a single PUCCH transmission. For example, a UE may distinguish between TRPs through a CORESET identifier (ID) and determine a recipient TRP based on the CORESET ID. In some aspects, a UE may not multiplex PUCCHs targeted towards different TRPs (e.g., due to network configuration or UE capability). For example, a UE may not multiplex the ACK/NACKs corresponding to PDSCHs transmitted from different TRPs and instead, a UE may send separate PUCCHs to each of the multiple TRPs, where each PUCCH may contain the ACK/NACKs corresponding to the PDSCHs transmitted from a single TRP. In some cases, the number of ACK/NACKs to be multiplexed in each PUCCH may be signaled using downlink control information (DCI). For instance, each TRP may signal the number of ACK/NACKs for multiplexing using a downlink assignment index (DAI) field in the DCI. In some examples, a UE may distinguish between transmissions from different TRPs via a TRP indicator field in DCI. In some cases, the TRP indicator may be included in one or both of a downlink DCI, and an uplink scheduling DCI. Further, the TRP indicator may be included in DCIs used for both dynamically scheduled transmissions (e.g., PDSCH, or PUSCH), as well as those used for the activation and deactivation of semi-persistently scheduled (SPS) transmissions (e.g., PDSCH, or PUSCH).

In a first deployment scheme, a UE may be configured with separate PUCCH configurations for PUCCHs targeted towards different TRPs. For example, a UE may be configured with multiple PUCCH configurations within the same uplink bandwidth part (BWP), one for each TRP. In some cases, each PUCCH configuration may configure multiple sets of PUCCH resources, each set containing PUCCH resources that correspond to uplink control information (UCI) transmission with certain payload sizes. In some cases, different PUCCH configurations may be associated with different quasi co-located configurations, for example, with respect to spatial domain parameters (e.g., corresponding a transmit/receive beam).

In some cases, the use of multiple antennas may be based on one or more antenna ports. An antenna port is a logical entity used to map data streams to antennas. A given antenna port may drive transmissions from one or more antennas. Some antenna ports may be referred to as quasi co-located, meaning that the spatial parameters (beam width, angle, beam direction, etc.) are quasi co-located if the channel over which a symbol on one antenna port is conveyed can be inferred from the spatial parameters of the channel over which a symbol on another antenna port is conveyed. For example, there may be a correlation between spatial parameters of two antenna ports if the two antenna ports are quasi co-located. A quasi co-location configuration may indicate one or more parameters (e.g., spatial parameters) that are quasi co-located.

Additionally or alternatively, each PUCCH configuration may be associated with separate power control loops. In some cases, different PUCCH configurations may be configured for different transmission time intervals. For instance, a first PUCCH configuration may be used to configure PUCCH resources in a first set of time intervals, while a second PUCCH configuration may be used to configure PUCCH resources in a second set of time intervals, which may be non-overlapping with the first set of time intervals (e.g., semi-static time division duplexing (TDD)). In some examples, the time interval may be a slot, or a mini-slot. In some aspects, the different PUCCH configurations for different time intervals may be coordinated between the TRPs through non-ideal backhaul, or determined at the network. In one example, a first PUCCH configuration may configure PUCCH resources in slots with even indices (e.g., slot 0, 2, or 4), while a second PUCCH configuration may configure PUCCH resources in slots with odd indices (e.g., slot 1, or 3). In some examples, a UE may only transmit PUCCH to one TRP in a given slot.

In some cases, uplink resources used to transmit PUCCH may be quasi co-located with a downlink RS from a TRP. Further, different TRPs may be associated with different downlink RSs, or power control loops. In some cases, each PUCCH resource of the PUCCH configuration for a TRP may be associated with a respective quasi co-location configuration. Thus, each quasi co-location configuration may correspond to a RS associated with a TRP from multiple TRPs. Further, each quasi co-location configuration may identify a power control loop index associated with a particular TRP.

In some cases, a joint PUCCH configuration may be used for multi TRP communications. In some cases, the carriers used by a UE for uplink control information may be grouped into different PUCCH groups (e.g., primary PUCCH group, and secondary PUCCH group). In one example, a UE may be configured with one PUCCH configuration per PUCCH group, jointly for all TRPs. In some cases, each PUCCH configuration may include multiple sets of PUCCH resources, where each set contains PUCCH resources that correspond to UCI transmissions with different payload sizes. In some cases, within each PUCCH resource set, resources may be split between TRPs (e.g., a first, and second TRP) based in part on semi-static coordination between the two TRPs.

In some cases, each PUCCH resource may be associated with one quasi co-location configuration. Further, the quasi co-location may be used to indicate the power control-loop index. In some examples, if a PUCCH resource is quasi co-located with a downlink RS 0 (e.g., a downlink RS associated with antenna port index 0), it may be transmitted towards a first TRP, while a second PUCCH resource quasi co-located with downlink RS 1 (e.g., a downlink RS associated with an antenna port index 1) may be transmitted towards a second TRP.

In some cases, a UE may send separate PUCCHs (e.g., containing ACK/NACK) to different TRPs. In some cases, the different TRPs may use different DAI calculations. For instance, the DAI may signal the number of ACK/NACKs that may need to be multiplexed in one PUCCH transmission. Further, the number may accumulate across time and frequency (e.g., over slots and CCs). Thus, the DAI in a given DCI may only count the number of ACK/NACKs for the corresponding TRP. In some cases, different TRPs may use separate K1 or ACK/NACK resource indicators (ARIs) to indicate PUCCH resources, such as a PUCCH resource indicator (PRI) indicating resources over which feedback may be transmitted. In some cases, K1 may represent a HARQ timing (e.g., a PDSCH-to-HARQ-ACK timing), which may be a delay between a downlink data transmission over PDSCH and an uplink HARQ-ACK transmission over PUCCH or physical uplink shared channel (PUSCH). In some cases, a UE may utilize different power control for different TRPs, which may be indicated via transmit power control indicators in the DCIs sent from the respective TRPs.

In some cases, a UE may piggyback the UCI on a PUSCH. For instance, UCI may be multiplexed with uplink data on a PUSCH. In some cases, a UE may send separate PUSCHs to different TRPs. In such cases, UCI targeted towards TRP A may only be piggybacked on a PUSCH transmitted for TRP A (e.g., no cross-TRP piggybacking). Thus, if a TRP has no configured PUSCH, no UCI piggybacking may be used for that TRP. In some cases, TRP-specific piggybacking techniques may also be utilized for channel state information (CSI) feedback, or scheduling request (SR). In such cases, a UE may only multiplex UCI targeted towards the same TRP (e.g., no cross-TRP UCI multiplexing).

In some cases, the network may provide for PUCCH collision resolution. For example, the network may configure different time-domain resources for different PUCCH configurations. For instance, via semi-static TDD, even numbered slots may be reserved for PUCCH transmissions to a first TRP, and odd numbered slots may be reserved for transmissions to a second TRP. In some cases, for example, to achieve a higher spectrum utilization, or due to lack of dynamic coordination, different TRPs may configure or schedule partially overlapping PUCCH transmissions. Further, in some cases, the UE may not multiplex the two PUCCHs targeted towards two TRPs. In such cases, a dropping rule may be defined based on the type of UCI. For instance, a PUCCH transmission that includes ACK/NACK feedback may be prioritized over SR, which may be prioritized over CSI-feedback. Thus, a lower priority PUCCH transmission that at least partially overlaps with a higher priority PUCCH transmission may be dropped partially or entirely, and the UE may instead transmit the higher priority PUCCH transmission.

Additionally or alternatively, a PUCCH transmission to a first TRP may be prioritized over a PUCCH transmission to a second TRP. In some cases, the channel starting symbol (e.g., orthogonal frequency division multiplexing (OFDM) symbol) may be used, such that a first PUCCH channel including a first PUCCH transmission that starts earlier in time than a second PUCCH channel carrying a second PUCCH transmission may have a higher priority. In some cases, the second PUCCH transmission may be dropped (i.e., partially, or entirely).

Particular aspects of the subject matter described herein may be implemented to realize one or more advantages. The described techniques may support improvements in feedback mechanisms, signaling overhead, and efficiency, among other advantages. As such, supported techniques may include improved network operations and, in some examples, may promote network efficiencies, among other benefits.

Aspects of the disclosure are initially described in the context of a wireless communications system. Aspects of the disclosure are further illustrated by and described with reference to control channel configurations, apparatus diagrams, system diagrams, and flowcharts that relate to feedback for multi-point communications.

FIG. 1 illustrates an example of a wireless communications system 100 that supports feedback for multi-point communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas, and base station 105 is an example of a TRP. Base stations 105 described herein may include or may be referred to by those skilled in the art as a base transceiver station, a radio base station, an access point, a radio transceiver, a NodeB, an eNodeB (eNB), a next-generation Node B or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an ID for distinguishing neighboring cells (e.g., a physical cell ID (PCID), a virtual cell ID (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a TRP. In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), TDD, or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, RSs, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, RSs, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In some cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In some cases, a smallest scheduling unit of the wireless communications system 100 may be shorter than a subframe or may be dynamically selected (e.g., in bursts of shortened TTIs (sTTIs) or in selected CCs using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or discrete Fourier transform-spread-OFDM (DFT-s-OFDM).

The organizational structure of the carriers may be different for different radio access technologies (e.g., LTE, LTE-A, LTE-A Pro, or NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that can support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink CCs and one or more uplink CCs according to a carrier aggregation configuration. Carrier aggregation may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, or 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, due to non-ideal backhaul conditions (e.g., backhaul latency exceeds a threshold), two or more TRPs (e.g., two or more base stations 105) may semi-statically coordinate (e.g., at an RRC level) their transmissions to a UE 115 using an NCJT scheme. In such cases, the base stations 105 may send separate downlink transmissions (e.g., PDCCH or PDSCH) to the same UE 115, based on an RRC configuration. In some aspects, the PDCCH transmissions from different base stations 105 may appear in different CORESETs within the same slot, while PDSCH transmissions may appear in the same or different slot.

In some cases, the UE 115 may need to know which base station 105 an ACK/NACK is targeted towards, since the UE 115 may multiplex multiple ACK/NACKs (e.g., for downlink transmissions from a base station 105) in one PUCCH transmission. In some cases, the network or base stations 105 may configure the UE 115 with one or more PUCCH configurations within the same uplink BWP or cell, where each base station 105 may be associated with a PUCCH configuration. In some cases, each PUCCH configuration may include multiple sets of PUCCH resources (e.g., in time-frequency) corresponding to UCI transmissions with varying payload sizes.

In some cases, each PUCCH configuration may be associated with different quasi co-location configurations, or power control loops. In some cases, a joint configuration may be used for PUCCH for the multiple TRPs. For instance, the UE 115 may be configured with one PUCCH configuration per PUCCH group. Further, each PUCCH configuration may include multiple sets of PUCCH resources, where the PUCCH resources of the set correspond to UCI transmissions with different payload sizes. In some cases, the PUCCH resources contained with each resource set may be split (equally, or uneven) via semi-static coordination between different base stations 105. In some cases, different base stations 105 may use separate PDSCH-to-HARQ-ACK timing (e.g., K1), or ARIs to indicate PUCCH resources.

In some cases, UCI may be piggybacked on PUSCH using UCI multiplexing. In some aspects, a UE 115 may send separate PUSCHs to different TRPs, and cross-TRP piggybacking may not be deployed. Additionally or alternatively, one or more dropping rules (e.g., based on priority) may be defined to alleviate problems arising due to PUCCH collisions. In some cases, different UCI types (e.g., ACK/NACK, SR, CSI-feedback) may be assigned different priorities, and a UE 115 may drop certain UCI transmissions due to overlapping PUCCH transmissions. In some cases, different TRPs may be assigned different priority levels. In such cases, uplink transmissions directed towards a certain TRP may be given precedence over transmissions to another TRP. In some cases, a PUCCH starting at an earlier symbol may be given priority over an overlapping channel starting later in time.

Figure 2:
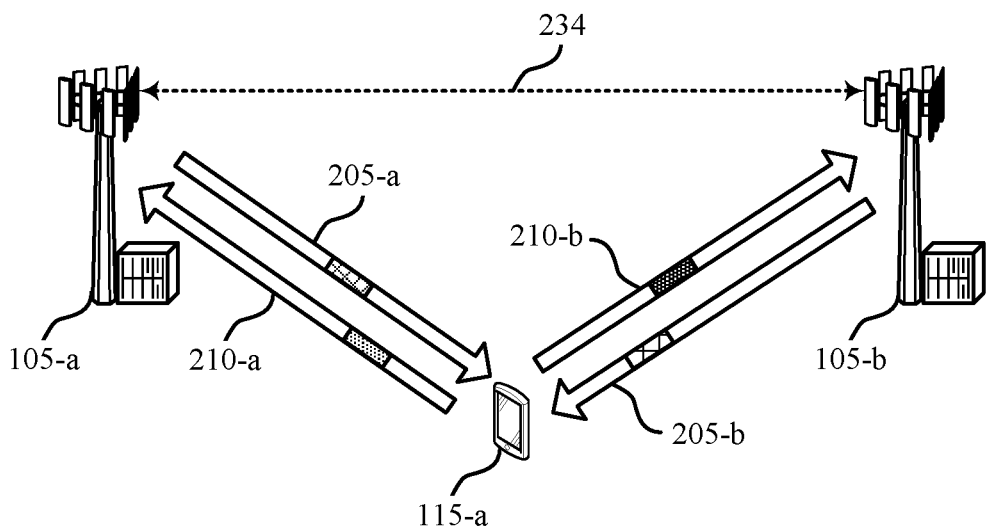
Figure 2:
Figure 2:
Figure 2:
Figure 2:

FIG. 2 illustrates an example of a wireless communications system 200 that supports feedback for multi-point communications in accordance with aspects of the present disclosure. In some examples, wireless communications system 200 may implement aspects of wireless communications system 100. The wireless communications system 200 may include UE 115-a, TRP 105-a, and TRP 105-b, which may be examples of the UE 115 and a TRPs (e.g., base stations 105) described with reference to FIG. 1. As shown, UE 115-a may communicate with TRP 105-a via downlink 205-a or uplink 210-a. Further, UE 115-a may communicate with TRP 105-b via downlink 205-b or uplink 210-b. In some cases, TRPs 105-a and 105-b may communicate using backhaul link 234. The wireless communications system 200 may also operate according to a given radio access technology (RAT) such as a fifth generation (5G) NR RAT, although techniques described herein may be applied to any RAT (e.g., LTE).

In some cases, wireless communications systems 200 may schedule communication resources to support both uplink and downlink transmissions. For instance, a wireless communications system may allocate a first set of resources to downlink transmissions, and a second set of resources to uplink transmissions. If the wireless communications system utilizes FDD for communications, then uplink and downlink transmissions may occur simultaneously. That is, the wireless communications system 200 may allocate a first set of frequencies to uplink transmissions and a second set of frequencies to downlink transmissions. In some cases, if TDD is supported for communications, then uplink and downlink transmissions may not occur simultaneously. That is, a wireless communications system 200 may allocate frequency resources to downlink transmissions during a first interval (e.g., one or more subframes) and uplink transmissions during a second interval (e.g., a subsequent subframe). In some cases, wireless communications systems 200 may also use a combination of FDD and TDD techniques.

For uplink transmissions, UE 115-a may receive an uplink grant from the base station 105 that indicates communication resources that are allocated to the UE 115-a for uplink transmissions (or "uplink communication resources"). In some cases, the uplink communication resources may be partitioned into control and data resources. In some cases, UCI may be transported using a PUCCH 220 (e.g., carried via the PUCCH 220-a or 220-b). or a PUSCH, for example, based on the presence of user data, or RRC signaling. In some cases, the UCI may include HARQ feedback (e.g., HARQ ACK/NACK), a channel quality indicator (CQI), MIMO feedback (e.g., a rank indicator (RI) or precoding matrix indicator (PMI)), SR for uplink transmissions, or a combination thereof. In some cases, PUCCH 220 may include one or more RBs at one (or both) ends of the uplink channel bandwidth.

In some cases, TRPs 105-a and 105-b may communicate with UE 115-a at the same (or different) time in a non-coherent manner, which may be referred to as NCJT. In some cases, a TRP 105 may transmit downlink channels 215 (e.g., downlink channel 215-a, or downlink channel 215-b), which may be examples of a PDCCH or PDSCH. In some examples, the downlink transmissions may be based in part on an RRC configuration. For instance, TRPs 105-*a* and 105-*b* communicating with UE 115-*a* may semi-statically coordinate their communications (e.g., with respect to PDSCH, PDCCH, PUCCH, PUSCH, RS configurations) at an RRC level, due to non-ideal backhaul conditions (e.g., latency over backhaul). In some aspects, non-ideal backhaul conditions may also imply that each TRP 105 may send a separate PDCCH or PDSCH. In some cases, the PDCCH for each TRP 105 may be configured in different CORESETs within the same slot, while the PDSCH for the TRPs 105 may configured in the same slot.

In some cases, UE 115-*a* may use multiplexing techniques to multiplex ACK/NACKs in response to a downlink channel 215 received from a TRP 105. In some cases, the UE 115-*a* may identify the recipient TRP 105 in order to multiplex ACK/NACKs in a single PUCCH transmission (e.g., PUCCH 220-*a*, or PUCCH 220-*b*). In some aspects, UE 115-*a* may not multiplex PUCCHs 220 targeted towards different TRPs 105 (e.g., due to network configuration or capability of UE 115-*a*). In some cases, the number of ACK/NACKs to be multiplexed in a PUCCH transmission (e.g., PUCCH 220-*a*, or PUCCH 220-*b*) may be signaled using DCI. For instance, each TRP 105 may signal the number of ACK/NACKs for multiplexing using a DAI field in the DCI. In some examples, the UE 115-*a* may distinguish between transmissions from different TRPs 105 via a TRP indicator field in DCI. In some cases, the TRP indicator field may convey a TRP indicator, which may be included in one or both of a downlink scheduling DCI (e.g., a downlink grant) or an uplink scheduling DCI (e.g., an uplink grant). Further, the TRP indicator may be included in DCI used for both dynamically scheduled transmissions (e.g., PDSCH, or PUSCH), as well as those used for the activation and deactivation of SPS transmissions (e.g., PDSCH or PUSCH).

In some cases, TRP 105-*a* or TRP 105-*b* may transmit control information indicating the scheduled and allocated resources in a downlink transmission to the UE 115-*a*. For example, the TRP 105 may transmit DCI on a downlink channel 215, such as a PDCCH. In some examples, the TRP 105 may transmit UE-specific scheduling assignments for downlink resource allocation, uplink grants, physical random access channel (PRACH) responses, uplink power control commands, and common scheduling assignments for signaling messages (e.g., such as system information) on the PDCCH. The TRP 105 may transmit the control information during one or more symbols within a given TTI (e.g., a slot, a mini-slot, an sTTI).

The TRP 105 may configure a CORESET and search space for transmission of control information (e.g., DCI) to the UE 115-*a* on a downlink control channel (e.g., downlink channel 215-*a*). The TRP 105-*a* may configure search space sets according to control channel candidates (e.g., PDCCH candidates) at one or more aggregation levels (ALs) to use for these DCI transmissions. When configuring a search space set, the TRP 105-*a* may determine a CORESET containing the search space set. This CORESET may include a number of control channel elements (CCEs) and the search space set may be mapped to a CCE space corresponding to a subset of CCEs of the CORESET. In some aspects, there may be more than one location associated with a DCI transmission in a control region of a TTI, and the UE 115-*a* may search all the possible locations. The possible locations for the DCI may differ depending on the configured CORESET, whether the search space is UE-specific or common, and also the supported ALs. In some cases, a PDCCH candidate of a certain AL may span the same number of contiguous CCEs (e.g., 4 CCEs for AL4).

In some cases, UE 115-*a* may distinguish between PDCCH transmissions (e.g., over downlink channel 215-*a*, or downlink channel 215-*b*) from the TRPs 105-*a* and 105-*b* through a CORESET ID. In some examples, the UE 115-*a* may be configured with multiple CORESETs, where each CORESET may be associated with a quasi co-location configuration. In some cases, each CORESET may correspond to one TRP. Further, the CORESET ID that is used while transmitting the PDCCH over downlink channel 215 (e.g., downlink channel 215-*a* or downlink channel 215-*b*) may indicate the specific TRP (e.g., TRP 105-*a* or TRP 105-*b*). In some aspects, the TRP 105 may transmit an indication of its TRP ID via a CORESET, where a CORESET ID associated with the CORESET indicates the TRP ID. In some examples, one TRP may be associated with multiple CORESETs, where the CORESET ID associated with each of the multiple CORESETs may be assigned to the same TRP 105.

In some cases, there may be an association defined between CORESETs from the same TRP 105 across CCs. In some cases, a first CORESET in a first cell may be associated with a second CORESET supported in a second cell, where the first and second cells may be supported by the same TRP 105. For instance, UE 115-*a* may assume that a CORESET0 on first cell A, and a CORESET0 on second cell B may be configured for the same TRP 105 (e.g., TRP 105-*a* or TRP 105-*b*).

In some cases, UE 115-*a* may send separate PUCCHs 220 (e.g., containing ACK/NACK) to TRPs 105. In some cases, the different TRPs 105 may use different DAI calculations. For instance, the DAI may signal the number of ACK/NACKs to be multiplexed in one PUCCH transmission. Further, the number may accumulate across time and frequency (e.g., over slots or CCs). Thus, the DAI in a given DCI may only count the number of ACK/NACKs for the corresponding TRP 105. In some cases, different TRPs 105 may use different K1/ARIs to indicate PUCCH resources. In some cases, K1 or PDSCH-to-HARQ-ACK timing may refer to a delay between a downlink data transmission over PDSCH (e.g., downlink channel 215-*a*), and an uplink HARQ-ACK transmission over PUCCH 220-*a* (or PUSCH). In some cases, the UE 115-*a* may utilize different power control parameters for transmitting PUCCH 220 to TRP 105-*a* or 105-*b*. In some cases, the power control parameters may be indicated via the TRP-specific DCI from the corresponding TRP 105.

In some cases, UE 115-*a* may piggyback UCI on a PUSCH. For instance, UCI may be multiplexed with the uplink data, and the multiplexed signals may be transmitted in a PUSCH transmission. In some cases, UE 115-*a* may send separate PUSCHs to different TRPs. In such cases, UCI targeted towards TRP 105-*a* may only be piggybacked on a PUSCH transmitted for TRP 105-*a* (e.g., no cross-TRP piggybacking). Thus, if a TRP 105 has no configured PUSCH, no UCI piggybacking may be used for that TRP 105. In some cases, TRP-specific piggybacking may also be utilized for CSI feedback or SRs. In such cases, the UE 115-*a* may multiplex UCI targeted towards the same TRP 105 (e.g., no cross-TRP UCI multiplexing).

In some cases, the network may provide for PUCCH collision resolution. For example, the network may configure different time-domain resources for different PUCCH configurations. For instance, even numbered slots may be reserved for PUCCH transmissions (e.g., PUCCH 220-*a*) to TRP 105-*a*, and odd numbered slots may be reserved for PUCCH transmissions (e.g., PUCCH 220-*b*) to TRP 105-*b*. In some cases, different TRPs 105 may configure or schedule PUCCH transmissions that may partially overlap (e.g., due to lack of dynamic coordination, or to achieve a higher spectrum utilization). Further, in some cases, the UE 115-*a* may not multiplex the two PUCCHs 220 targeted towards their respective TRPs 105-*a*, and 105-*b*. In such cases, a dropping rule may be defined for PUCCH transmissions based on the type of UCI. For instance, ACK/NACK may be prioritized over SR, which may be prioritized over CSI-feedback. Additionally or alternatively, transmissions from one TRP 105 may be prioritized over the other. In some cases, the channel starting symbol (e.g., OFDM symbol) may be used such that a channel starting earlier may have a higher priority. In some cases, for overlapping PUCCH transmissions with different priorities, the overlapping portion of the PUCCH with the lower priority may be dropped (i.e., partially). In some other cases, the PUCCH with lower priority may be dropped entirely, for example, to reduce implementation complexity at UE 115-*a*.

In some cases, and as further described with reference to FIGS. 3 and 4, PUCCH resources for the UE 115-*a* may be configured using separate PUCCH configurations for TRPs 105-*a* and 105-*b*, or a joint configuration may be used for both TRPs 105.

Figure 3:
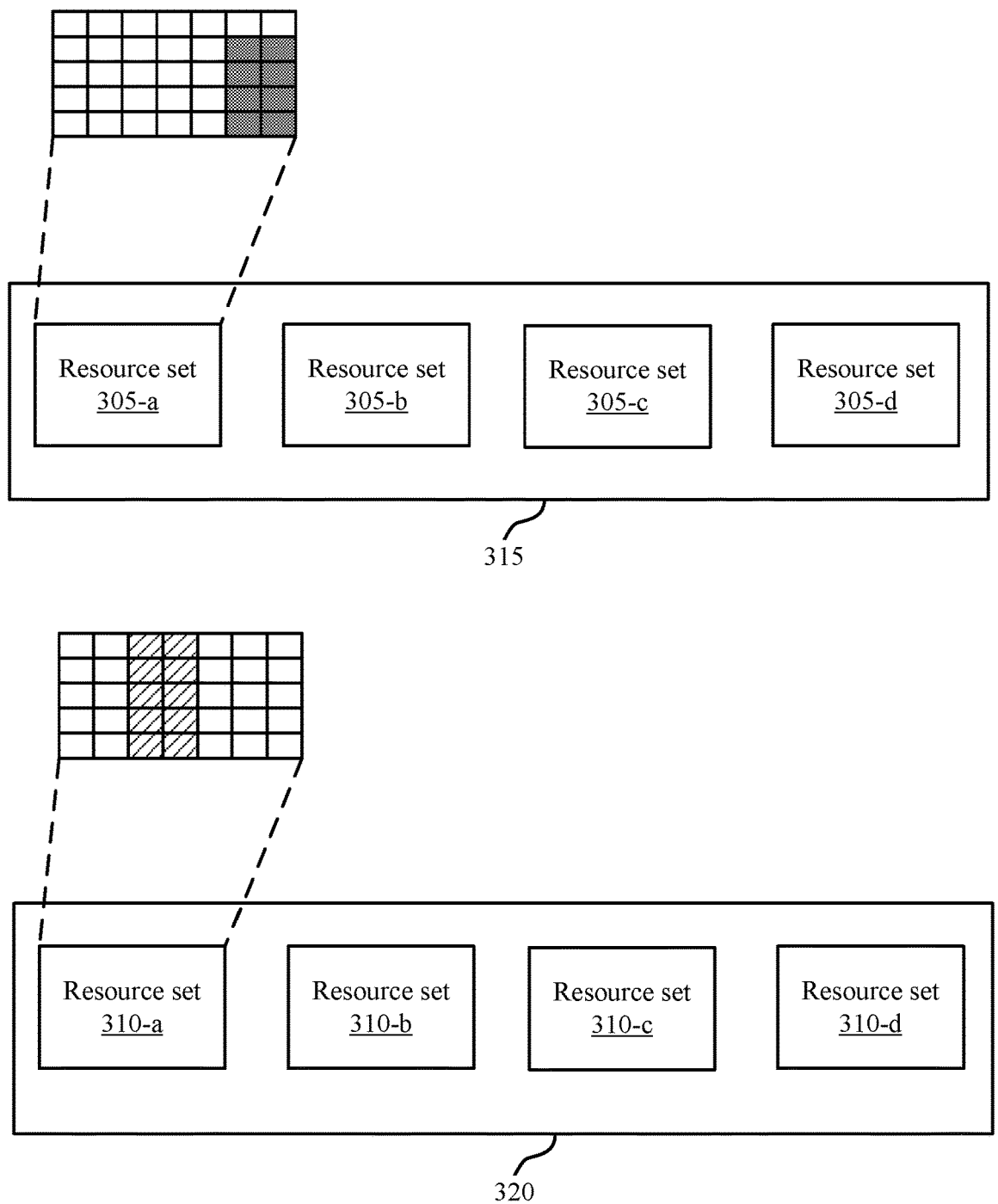
FIGS. 3 and 4 illustrate examples of control channel configurations that support feedback for multi-point communications in accordance with aspects of the present disclosure.

FIG. 3 illustrates an example of a configuration 300 that supports feedback for multi-point communications in accordance with aspects of the present disclosure. In some examples, configuration 300 may implement aspects of wireless communications systems 100 or 200. In some cases, configuration 300 may be deployed for transmissions between a UE 115, and one or more TRPs 105, which may be examples of the corresponding devices described with reference to FIGS. 1 and 2.

In some cases, a UE 115 may be configured with separate PUCCH configurations (e.g., PUCCH configuration 315, and PUCCH configuration 320) within the same uplink BWP for different TRPs. Further, each PUCCH configuration may include multiple sets of PUCCH resources, each set containing PUCCH resources that correspond to UCI transmission with different payload sizes. As illustrated, PUCCH configuration 315 for a first TRP may configure resource sets 305-*a*, 305-*b*, 305-*c*, and 305-*d*, while PUCCH configuration 320 may configure resource sets 310-*a*, 310-*b*, 310-*c*, and 310-*d*. In one example, resource set 305-*a* may include PUCCH resources 325, and resource set 310-*a* may include PUCCH resources 330. As shown, PUCCH resources 325 and 330 may be non-overlapping in time. In some cases, PUCCH resources 325 and 330 may be from different slots (not shown). In some cases, PUCCH configurations 315 and 320 may be associated with different quasi co-location configurations, for example, with respect to spatial domain parameters. Additionally or alternatively, the PUCCH configuration may be associated with different power control loops.

In some cases, different PUCCH configurations may be configured for different TTIs. For instance, PUCCH configuration 315 may be used to configure PUCCH resources in a first set of time intervals for a first TRP, while PUCCH configuration 320 may be used to configure PUCCH resources in a second set of time intervals for a second TRP, which may be non-overlapping with the first set of time intervals. In some examples, the time interval may be a slot or a mini-slot. In some aspects, the different PUCCH configurations for different time intervals may be coordinated between the TRPs (e.g., using semi-static TDD), or determined at the network.

In some cases, uplink resources used to transmit PUCCH may be quasi co-located with a downlink RS from a TRP. Further, different TRPs may be associated with different downlink RSs, or power control loops. In some cases, each PUCCH resource of the PUCCH configuration for a TRP may be associated with a respective quasi co-location configuration. Thus, each quasi co-location configuration may correspond to a RS associated with a TRP from multiple TRPs. Further, each quasi co-location configuration may identify a power control loop index associated with that TRP.

Figure 4:
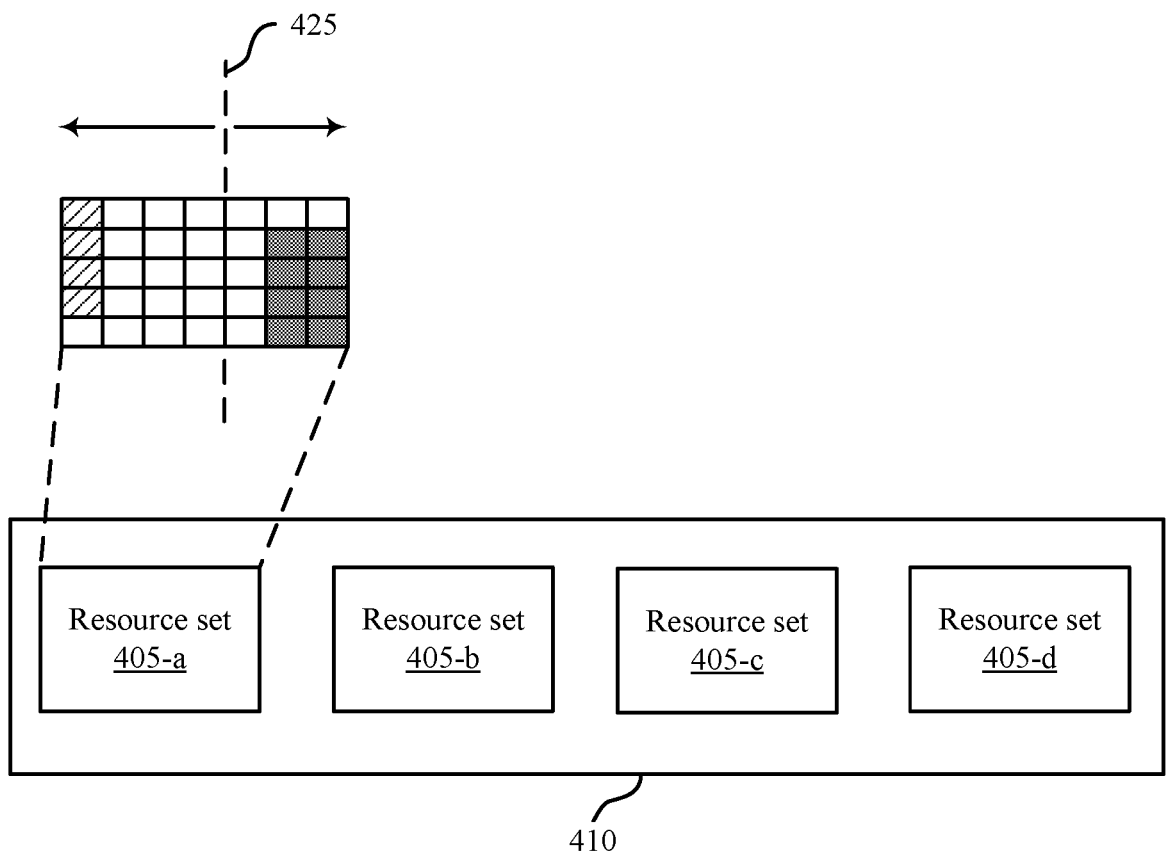

FIG. 4 illustrates an example of a configuration 400 that supports feedback for multi-point communications in accordance with aspects of the present disclosure. In some examples, configuration 400 may implement aspects of wireless communications systems 100 or 200. In some cases, configuration 400 may be deployed for transmissions between a UE 115 and one or more TRPs 105, which may be examples of the corresponding devices described with reference to FIGS. 1 and 2.

In some cases, a joint PUCCH configuration may be used for multi TRP communications. In some cases, the carriers used by a UE 115 for UCI may be grouped into different PUCCH groups (e.g., primary PUCCH group, and secondary PUCCH group). In one example, a UE 115 may be configured with one PUCCH configuration (e.g., joint PUCCH configuration 410) per PUCCH group, jointly for all TRPs. In some cases, joint PUCCH configuration 410 may include multiple sets of PUCCH resources (e.g., resource sets 405-*a*, 405-*b*, 405-*c*, and 405-*d*), where each set contains PUCCH resources (e.g., PUCCH resources 415, and 420 in resource set 405-*a*) that correspond to UCI transmissions with different payload sizes.

In some cases, within each PUCCH resource set, resources may be split between TRPs (e.g., a first, and second TRP) based in part on semi-static coordination between the two TRPs. As illustrated, PUCCH resources 415 and 420 within resource set 405-*a* may be assigned to different TRPs. In some cases, a DCI transmitted from a TRP may carry an ARI field, which may be used to indicate the uplink resources for ACK/NACK transmissions to that TRP. In one example, for a PUCCH resource set with 8 PUCCH resources, a global index utilizing 3 bits (000-111) may be used for the ARI field. In such cases, resources indexed 0-3 may be assigned to a first TRP (e.g., TRP A), and resources indexed 4-7 may be assigned to a second TRP (e.g., TRP B). In another example, the 8 PUCCH resources may be split unevenly between TRP A and TRP B. For example, resources indexed 0-5 may be assigned to a first TRP (e.g., TRP A), and resources indexed 6-7 may be assigned to a second TRP (e.g., TRP B). In a third example, a compressed signaling method utilizing 2 bits (00-11) may be used in conjunction with a differentiating signal (e.g., TRP specific) for joint configuration of PUCCH.

In one example, 2 bits in the ARI field may correspond to resources 0-3 (e.g., 00), or resources 4-7 (e.g., 11). In such cases, the differentiating signal between TRP A and TRP B may be used by the UE while selecting PUCCH resources. For instance, if the UE determines the PDCCH transmission is from TRP A, the UE may utilize a resource from resources 0-3 for PUCCH. In some cases, each PUCCH resource may be associated with one quasi co-location configuration. Further, the quasi co-location may be used to indicate the power control-loop index. In some examples, if a PUCCH resource is quasi co-located with a downlink RS 0 (downlink RS 0), it may be transmitted towards a first TRP, while a second PUCCH resource quasi co-located with downlink RS 1 may be transmitted towards a second TRP.

In some cases, the network may configure different time-domain resources for PUCCH transmissions to different TRPs. As illustrated through slot boundary 425, PUCCH resources 415 and 420 may be located within different slots.

Figure 5:
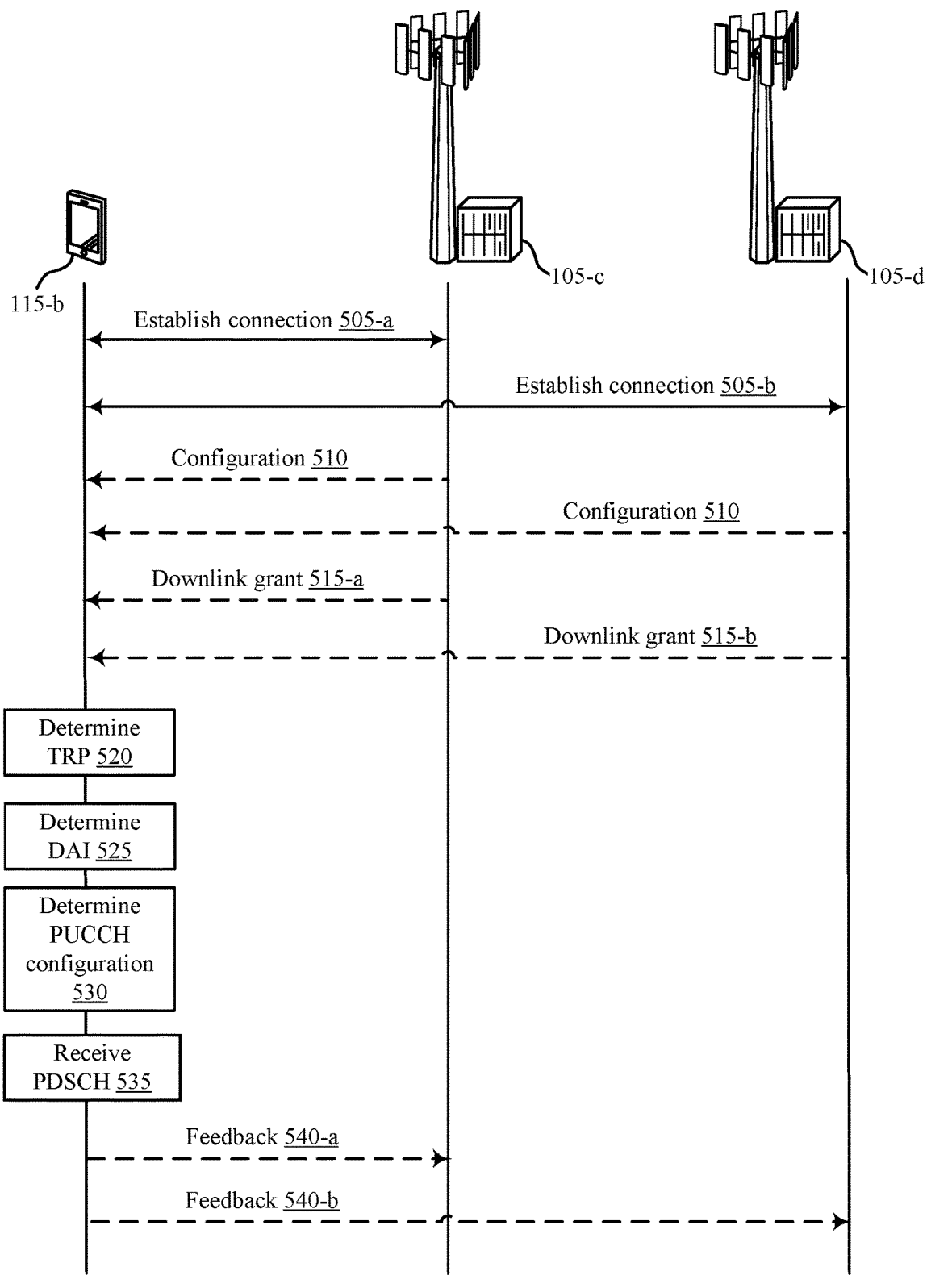
FIG. 5 illustrates an example of a process flow that supports feedback for multi-point communications in accordance with aspects of the present disclosure.

FIG. 5 illustrates an example of a process flow 500 that supports feedback for multi-point communications in accordance with various aspects of the present disclosure. Process flow 500 may be performed by UE 115-*b*, and TRPs 105-*c* and 105-*d*, which may be an example of the corresponding devices described in FIGS. 1 and 2. In some examples, UE 115-*b*, and TRPs 105-*c* and 105-*d* may operate using a RAT such as a 5G NR RAT, although techniques described herein may be applied to any RAT.

At 505-*a*, and 505-*b*, UE 115-*b* may establish a connection with TRP 105-*c*, and TRP 105-*d*, respectively. In some examples, the connection may be established using a random access channel (RACH) procedure.

At 510, the UE 115-*b* may receive a configuration message from TRP 105-*c* or TRP 105-*d*, or both. In some cases, the message may configure the UE 115-*b* to monitor a plurality of CORESETs, where each resource set of the plurality of CORESETs is associated with one of TRP 105-*c* or TRP 105-*d*. In some cases, the UE 115-*b* may also determine a PUCCH configuration (e.g., joint or separate) for transmitting a multiplexed set of feedback messages associated with multiple communications with TRP 105-*c* or TRP 105-*d*.

At 515-*a* or 515-*b*, the UE 115-*b* may receive a downlink grant from TRP 105-*c*, TRP 105-*d*, or both. For example, at 515-*a*, UE 115-*b* may receive, via a first CORESET of the plurality of resource sets, a first downlink grant (e.g., over a first PDCCH) from TRP 105-*c*. Additionally or alternatively, at 515-*b*, UE 115-*b* may receive, via a second CORESET of the plurality of resource sets, a second downlink grant (e.g., over a second PDCCH) from TRP 105-*d*. In some examples, the configuration message received at 510 may indicate an associated between the first and second CORESETs and the TRPs 105-*c* and 105-*d*. For instance, the configuration message received at 510 may indicate that TRP 105-*c* is associated with the first CORESET and TRP 105-*d* is associated with the second CORESET. In some cases, the downlink grant(s) may be used to allocate PDSCH resources for a data transmission to the UE 115-*b*. Additionally or alternatively, one or more of the downlink grant(s) received at 515-*a* or 515-*b* may include an ARI (e.g., a PRI) or an indication of K1, which may be used by UE 115-*b* to determine resources for transmission of one or more feedback messages (e.g., a HARQ-ACK message).

As described herein, the downlink DCI containing the downlink grant may include a TRP indicator field, which may allow the UE 115-*b* to distinguish transmissions between the TRPs 105-*c* and 105-*d*. Additionally or alternatively, the CORESET ID associated with a CORESET over which the downlink grant is received may be used to indicate a TRP ID for TRP 105-*c* or TRP 105-*d* to which feedback from the UE 115-*b* is to be transmitted.

At 520, the UE 115-*b* may determine the TRP (e.g., TRP 105-*c* or TRP 105-*d*) associated with the downlink grant(s) received at 515-*a* or 515-*b*.

At 525, the UE 115-*b* may determine the number of feedback messages (or information bits) to multiplex in the feedback information via the DAI field received in DCI containing the downlink grant received at 515-*a* or 515-*b*. In some cases, each TRP 105-*c* and 105-*d* may utilize different DAI calculations and the DAI in a given DCI (e.g., downlink grant received at 515-*a* or downlink grant received at 515-*b*) may only count the number of ACK/NACKs for the TRP (e.g., TRP 105-*c* or TRP 105-*d*) associated with the DCI.

At 530, the UE 115-*b* may determine PUCCH resources for transmitting UCI, based in part on the PUCCH configuration received at 510, the downlink grant(s) received at 515-*a* or 515-*b*, information of the DCI containing the downlink grant(s), or any combination thereof. In some cases, for a separate configuration, the PUCCH configuration may specify a first PUCCH configuration for TRP 105-*c*, and a second PUCCH configuration for TRP 105-*d*. In some aspects, the network may configure different time-domain resources for the first and second PUCCH configurations. In some examples, the PUCCH resources may be quasi co-located with a downlink RS from a respective TRP 105. For instance, the PUCCH resources associated with the first PUCCH configuration may be quasi co-located with a first downlink RS from TRP 105-*c*, while PUCCH resources associated with the second PUCCH configuration may be quasi co-located with a second downlink RS from TRP 105-*d*. In some cases, the first and second PUCCH configurations may be associated with different power control loops.

In some other cases, the UE 115-*b* may determine a single (or joint) PUCCH configuration for TRPs 105-*c* and 105-*d*, based on the configuration received at 510, the downlink grant(s) received at 515-*a* or 515-*b*, information of the DCI containing the downlink grant(s), or any combination thereof. Further, each PUCCH resource of the single PUCCH configuration may be associated with a respective quasi co-location configuration. In some cases, each quasi co-location configuration may identify a power control loop index associated with TRP 105-*c* or TRP 105-*d*. In some cases, PUCCH resources of the single PUCCH configuration may be split between the TRPs 105-*c* and 105-*d*.

In some aspects, the UE 115-*b* may determine the one or more PUCCH resources based in part on a K1/ARI received in the DCI. For example, the UE 115-*b* may select a first PUCCH resource of a set of PUCCH resources based on the K1, ARI, or PRI received in the DCI carrying the downlink grant(s) received at 515-*a* or 515-*b*. In one example, the UE 115-*b* may select a first PUCCH resource of a set of PUCCH resources for transmitting feedback to TRP 105-*c* based on the downlink grant received at 515-*a* (e.g., using a K1, ARI, or PRI contained in the downlink grant). In another example, UE 115-*b* may select a second PUCCH resource of a set of PUCCH resources for transmitting feedback to TRP 105-*d* based on the downlink grant received at 515-*b* (e.g., using K1, ARI, or PRI contained in the downlink grant).

At 535, the UE 115-*b* may receive downlink data transmissions over PDSCH, based in part on the downlink grant(s) received at 515-*a* or 515-*b*.

At 540-*a* or 540-*b*, the UE 115-*b* may transmit a multiplexed set of feedback messages associated with multiple communications to TRP 105-*c*, TRP 105-*d*, or both. For example, UE 115-*b* may transmit feedback at 540-*a* containing the multiplexed set of feedback messages to TRP 105-*c* in a PUCCH. The PUCCH may be transmitted via a first PUCCH resource selected from a set of PUCCH resources based on the downlink grant received at 515-*a* (e.g., the UE 115-*b* may select the first PUCCH resource based on a K1, ARI, or PRI indicated by the downlink grant received at 515-*a*). Additionally or alternatively, the UE 115-*b* may transmit feedback at 540-*b* containing the multiplexed set of feedback messages to TRP 105-*d* in a PUCCH. The PUCCH may be transmitted via a second PUCCH resource selected from a set of PUCCH resources based on the downlink grant received at 515-*b* (e.g., the UE 115-*b* may select the second PUCCH resource based on a K1, ARI, or PRI indicated by the downlink grant received at 515-*b*). In some cases, the feedback may be transmitted based on the DAI received at 525 and the PUCCH configuration determined at 530.

In some aspects, the feedback may be transmitted at 540-*a* or 540-*b* information transmitted in response to a PDSCH scheduled by downlink grant received at 515-*a* or 515-*b*, and may be transmitted using a PUSCH. For instance, UCI containing the feedback transmitted at 540-*a* or 540-*b* may be piggybacked on (e.g., transmitted concurrently or multiplexed with) a PUSCH from the UE 115-*b*. For example, UE 115-*b* may receive an uplink grant from TRP 105-*c* scheduling a PUSCH to TRP 105-*c*, or the UE 115-*b* may receive an uplink grant from TRP 105-*d* scheduling a PUSCH to TRP 105-*d*. In some aspects, UE 115-*b* may transmit feedback at 540-*a* to TRP 105-*c* via a first PUSCH based on whether the uplink grant scheduling the first PUSCH being transmitted to the UE 115-*b* from TRP 105-*c*. Additionally or alternatively, UE 115-*b* may transmit feedback at 540-*b* to TRP 105-*d* via a second PUSCH based on whether the uplink grant scheduling the second PUSCH being transmitted to the UE 115-*b* from TRP 105-*d*. In some aspects, the uplink grant scheduling the PUSCH may be received in a CORESET associated with one of TRP 105-*c* or 105-*d* and the UE 115-*b* may determine to transmit feedback at 540-*a* or 540-*b* to one of TRP 105-*c* or 105-*d* based on the CORESET (e.g., CORESET ID).

Figure 6:
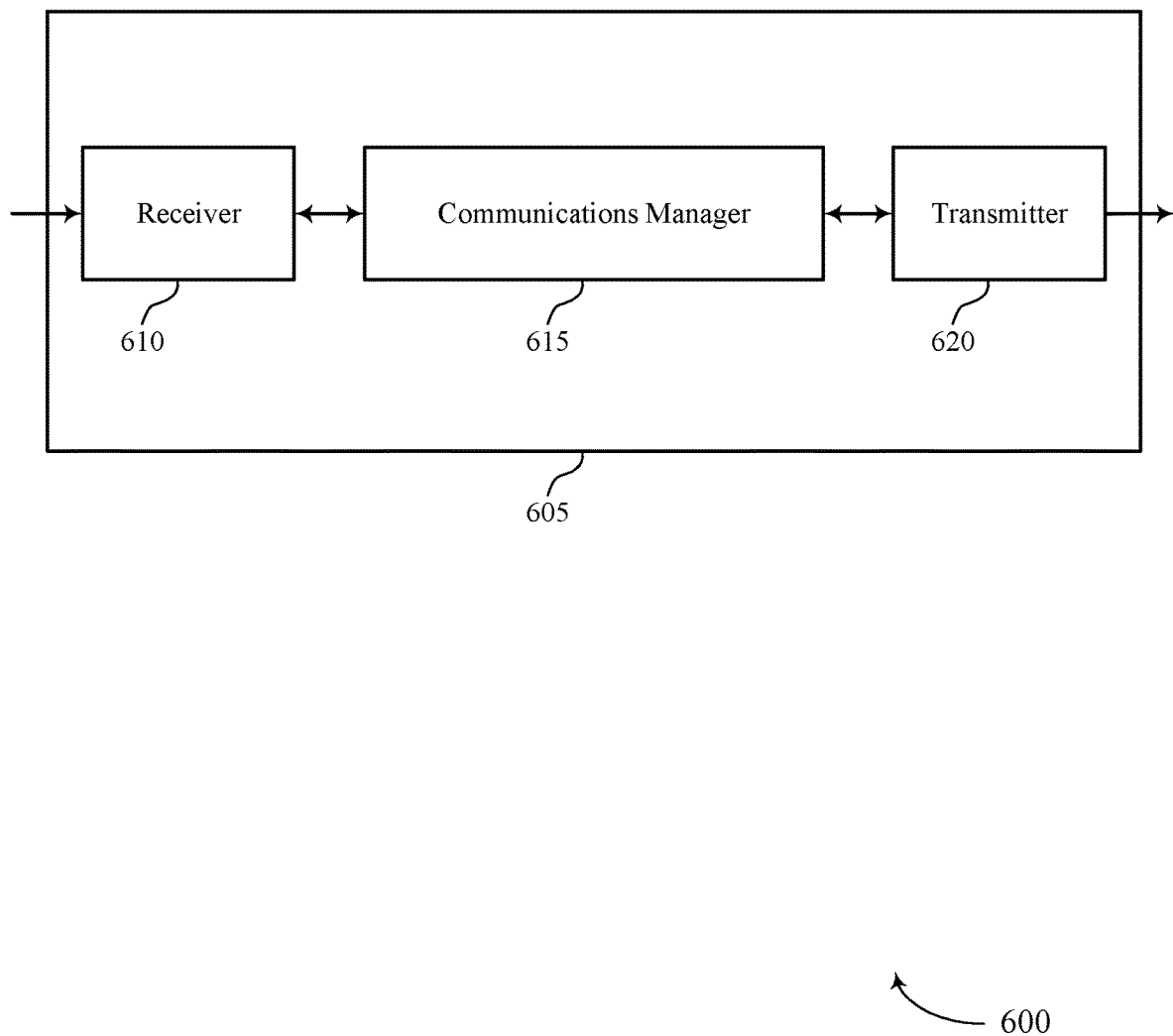
FIGS. 6 and 7 show block diagrams of devices that support feedback for multi-point communications in accordance with aspects of the present disclosure.

FIG. 6 shows a block diagram 600 of a device 605 that supports feedback for multi-point communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to feedback for multi-point communications). Information may be passed on to other components of the device 605. The receiver 610 may be an example of aspects of the transceiver 920 described with reference to FIG. 9. The receiver 610 may utilize a single antenna or multiple antennas.

The communications manager 615 may receive, via a first CORESET of a set of CORESETs monitored by the UE, a first downlink grant that schedules a downlink data transmission to the UE, receive the downlink data transmission from a first TRP of a set of TRPs, and transmit feedback information for the downlink data transmission to the first TRP based on the first TRP being associated with the first CORESET or the first downlink grant being received via the first CORESET. The communications manager 615 may be an example of aspects of the communications manager 910 described herein with reference to FIG. 9.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or multiple antennas.

In some examples, the communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

Figure 10:
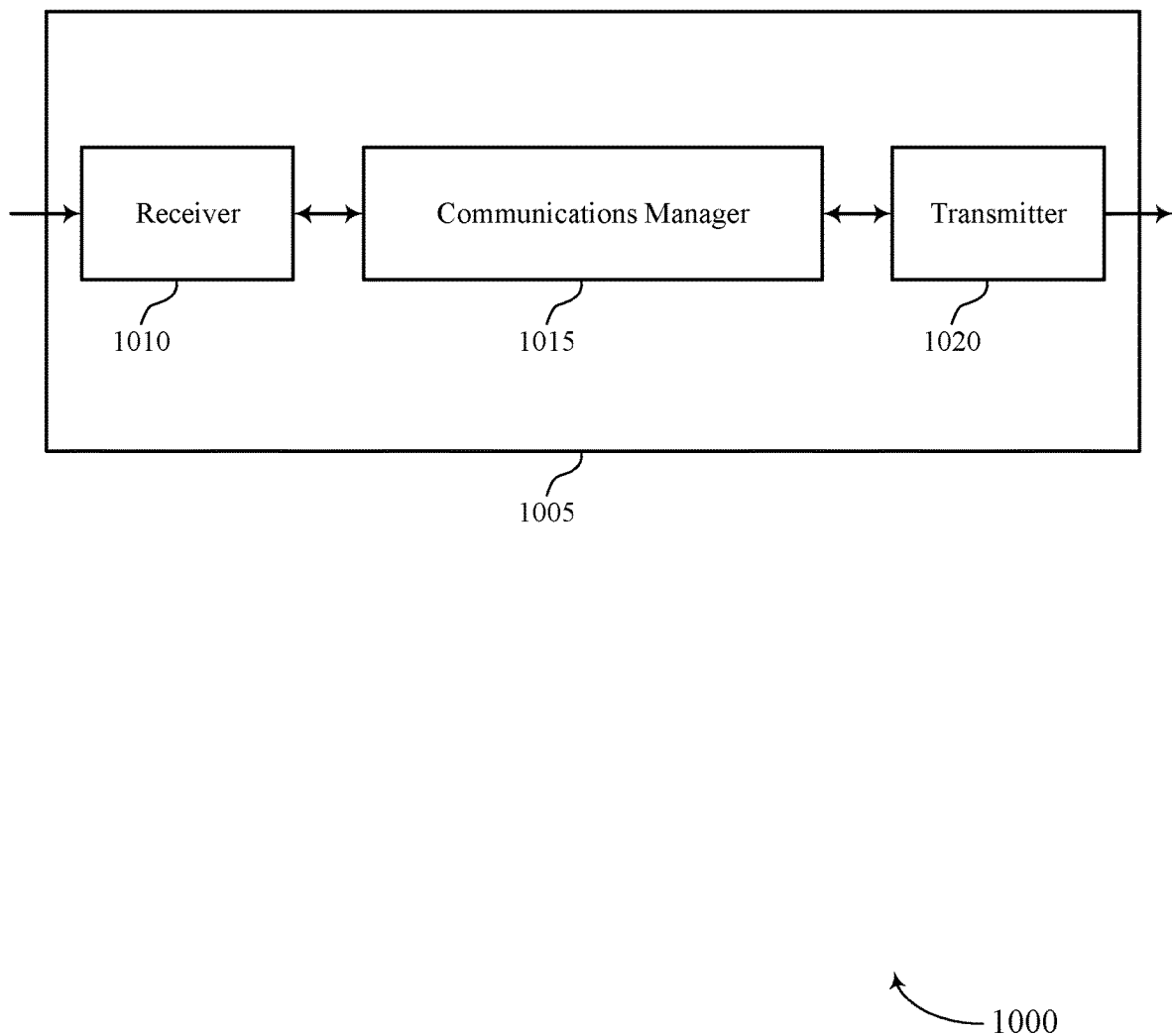
FIGS. 10 and 11 show block diagrams of devices that support feedback for multi-point communications in accordance with aspects of the present disclosure.

The communications manager 615 as described herein may be implemented to realize one or more potential advantages. One implementation may allow the device 605 to more efficiently perform feedback mechanisms by allowing the device 605 to target feedback to a particular TRP that transmitted a downlink transmission to the device 1005, as shown in FIG. 10. For example, the device 1005 may identify the TRP to which the device 1005 may transmit ACK/NACK feedback information based on a received downlink data transmission. In some cases, the downlink data transmission may be based on a CORESET associated with a TRP that was used to schedule the downlink data transmission, or a TRP ID included in a first downlink grant used to schedule the downlink data transmission.

Based on implementing the feedback mechanism techniques as described herein, a processor of a UE 115 (e.g., controlling the receiver 610, the transmitter 620, or the transceiver 920 as described with reference to FIG. 9) may reduce the amount of time used to provide feedback and meeting certain timing constraints by avoiding the exchange of feedback information via backhaul links.

Figure 7:
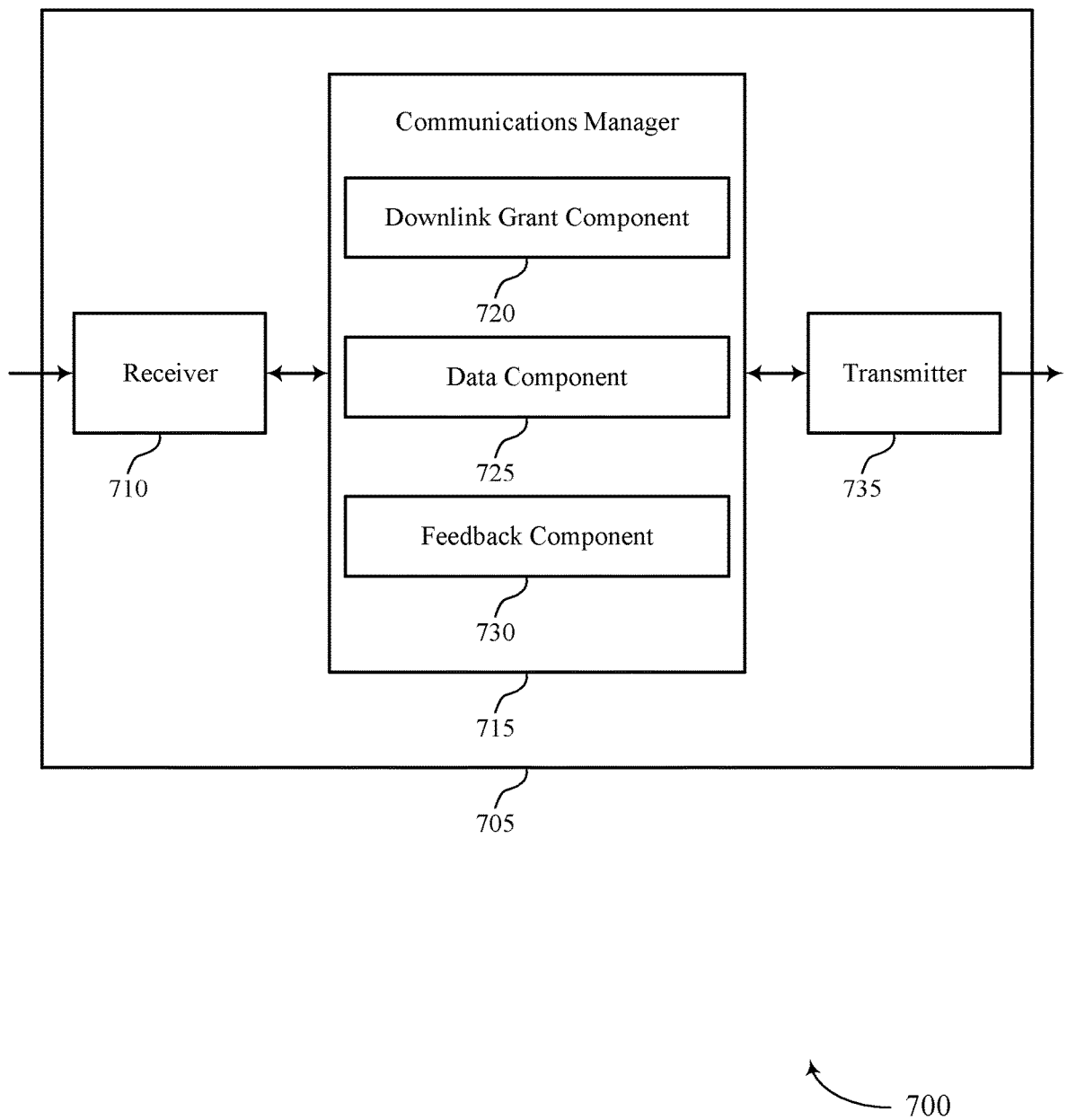

FIG. 7 shows a block diagram 700 of a device 705 that supports feedback for multi-point communications in accordance with aspects of the present disclosure. The device 705 may be an example of aspects of a device 605 or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to feedback for multi-point communications). Information may be passed on to other components of the device 705. The receiver 710 may be an example of aspects of the transceiver 920 described with reference to FIG. 9. The receiver 710 may utilize a single antenna or multiple antennas.

The communications manager 715 may be an example of aspects of the communications manager 615 as described herein. The communications manager 715 may include a downlink grant component 720, a data component 725, and a feedback component 730. The communications manager 715 may be an example of aspects of the communications manager 910 described herein.

The downlink grant component 720 may receive, via a first CORESET of a set of CORESETs monitored by the UE, a first downlink grant that schedules a downlink data transmission to the UE. The data component 725 may receive the downlink data transmission from a first TRP of a set of TRPs.

The feedback component 730 may transmit feedback information for the downlink data transmission to the first TRP based on the first TRP being associated with the first CORESET or the first downlink grant being received via the first CORESET.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or multiple antennas.

Figure 8:
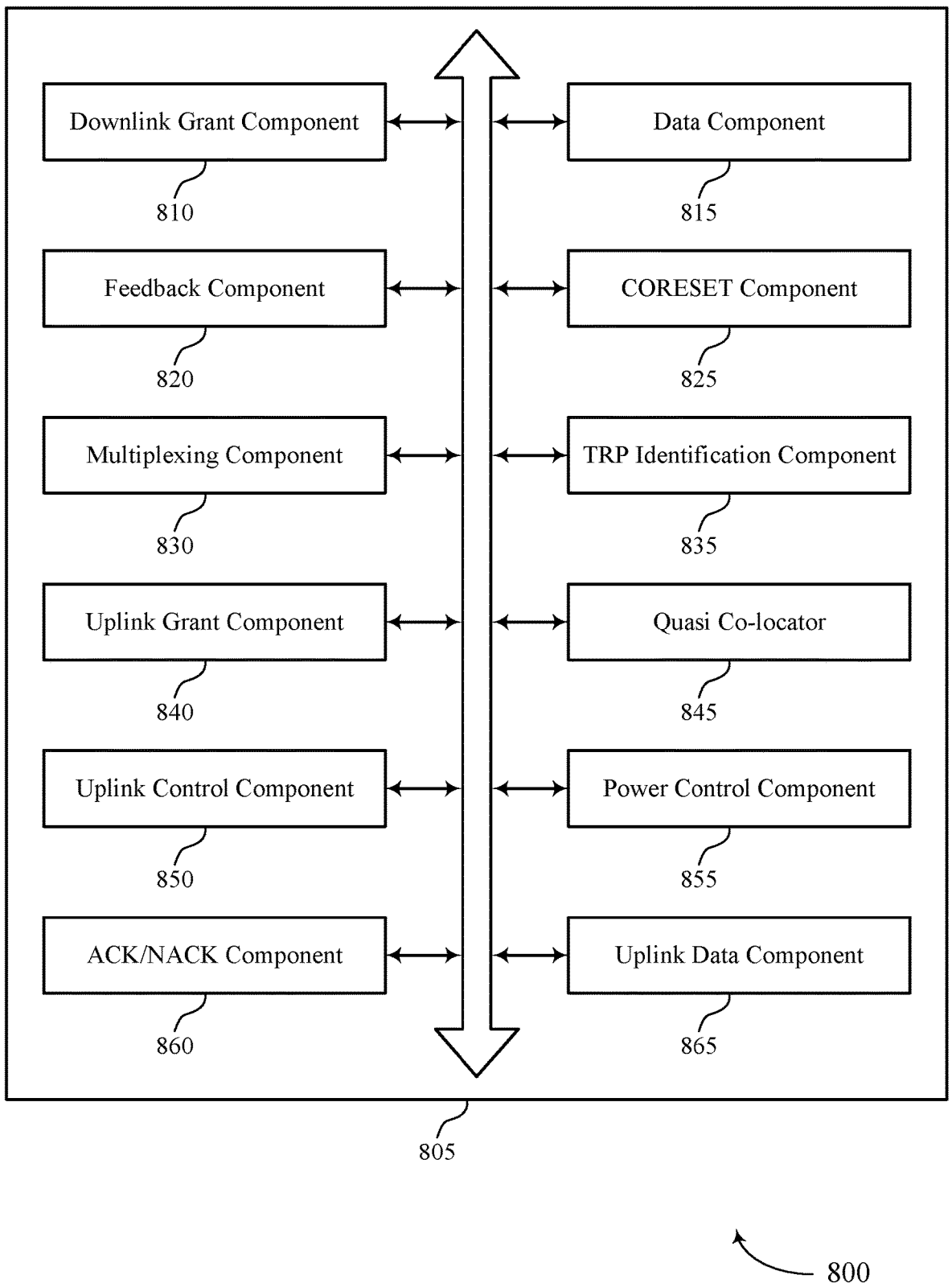
FIG. 8 shows a block diagram of a communications manager that supports feedback for multi-point communications in accordance with aspects of the present disclosure.

FIG. 8 shows a block diagram 800 of a communications manager 805 that supports feedback for multi-point communications in accordance with aspects of the present disclosure. The communications manager 805 may be an example of aspects of a communications manager 615, a communications manager 715, or a communications manager 910 described herein. The communications manager 805 may include a downlink grant component 810, a data component 815, a feedback component 820, a CORESET component 825, a multiplexing component 830, a TRP identification component 835, an uplink grant component 840, a quasi co-locator 845, an uplink control component 850, a power control component 855, an ACK/NACK component 860, and an uplink data component 865. Each of these modules may communicate, directly or indirectly, with one another (e.g., via one or more buses).

The downlink grant component 810 may receive, via a first CORESET of a set of CORESETs monitored by the UE, a first downlink grant that schedules a downlink data transmission to the UE. In some examples, the downlink grant component 810 may receive, via a second CORESET of the set of CORESETs monitored by the UE, a second downlink grant that schedules a second downlink data transmission to the UE. In some cases, the downlink grant component 810 may receive, from the first TRP, a first uplink grant via the first CORESET, the first uplink grant scheduling a first uplink transmission to the first TRP.

The data component 815 may receive the downlink data transmission from a first TRP of a set of TRPs. In some examples, the data component 815 may receive a second downlink data transmission from a second TRP of the set of TRPs. In some examples, the data component 815 may receive the second downlink data transmission from a second TRP of the set of TRPs. In some aspects, the data component 815 may transmit the first uplink transmission to the first TRP based at least in part on the first uplink grant. In some cases, the data component 815 may transmit the feedback information for the downlink data transmission to the first TRP via the first uplink transmission. In some aspects, the feedback information is transmitted via the first uplink transmission based at least in part on the first downlink grant and the first uplink grant being received via the first CORESET.

The feedback component 820 may transmit feedback information for the downlink data transmission to the first TRP based on the first TRP being associated with the first CORESET or the first downlink grant being received via the first CORESET. In some examples, the feedback component 820 may transmit feedback information for the downlink data transmission to the first TRP via resources associated with the first PUCCH configuration.

In some examples, the feedback component 820 may transmit feedback information for the second downlink data transmission to the second TRP via resources associated with the second PUCCH configuration. In some examples, the feedback component 820 may transmit feedback information for the downlink data transmission to the first TRP via a first subset of resources of the single PUCCH configuration.

In some examples, the feedback component 820 may transmit feedback information for a second downlink data transmission to the second TRP via a second subset of resources of the single PUCCH configuration, where the second subset of resources is non-overlapping with the first subset of resources. In some examples, the feedback component 820 may transmit feedback information for the second downlink data transmission to the second TRP based on the second TRP being associated with the second CORESET or the second downlink grant indicating the second TRP.

In some examples, the feedback component 820 may determine whether to drop at least a portion of the feedback information for the data transmission or the feedback information for the second data transmission based on a set of priority rules, where the set of priority rules is based on an uplink control information type, a TRP priority, or a starting symbol associated with transmission of the feedback information for the data transmission or the second data transmission.

In some cases, the feedback information for the downlink data transmission is transmitted via a first PUCCH to the first TRP according to a DAI associated with the first downlink grant. In some cases, the feedback information for the second downlink data transmission is transmitted via a second PUCCH to the second TRP according to a DAI associated with the second downlink grant.

In some examples, the feedback information for the first downlink data transmission and the second downlink data transmission are transmitted within a same time interval, wherein the time interval comprises a slot or a mini-slot.

The CORESET component 825 may receive a configuration message configuring the UE to monitor the set of CORESETs, where the set of CORESETs are associated with the set of TRPs for coordinating communication with the UE, and where the configuration message indicates that the first TRP is associated with the first CORESET. In some cases, the CORESET component 825 may receive a first uplink resource indicator (e.g., an PRI) in the first downlink grant and select a first subset of resources from a set of uplink resources (e.g., PUCCH resources) indicated by the single PUCCH configuration based at least in part on the first uplink resource indicator. In some aspects, the CORESET component 825 may receive a second downlink grant that schedules a second downlink data transmission from a second TRP of the multiple TRPs, where the second downlink grant contains a second uplink resource indicator (e.g., a PRI) and select a second subset of resources from the set of uplink resources (e.g., PUCCH resources) indicated by the single PUCCH configuration based at least in part on the second uplink resource indicator. In some examples, the CORESET component 825 may transmit feedback information for the second downlink data transmission to the second TRP via the second subset of resources of the single PUCCH configuration, where the second subset of resources is nonoverlapping with the first subset of resources.

In some examples, two CORESETs of the set of control resources sets are associated with one TRP of the set of TRPs. In some cases, the first CORESET corresponds to multiple TRPs of the set of TRPs. In some cases, the first CORESET is configured in a first cell supported by the first TRP. In some cases, the first CORESET is associated with a second CORESET supported by a second cell of the first TRP.

The multiplexing component 830 may receive, via the first downlink grant, an indication of a number of feedback messages to multiplex in the feedback information, where the indication is conveyed via a DAI field in DCI. In some examples, transmitting the feedback information includes transmitting a multiplexed set of feedback messages associated with multiple communications between the first TRP and the UE, where the multiplexed set of feedback messages includes the feedback information for the downlink data transmission. In some examples, the multiplexing component 830 may transmit, via an uplink control channel, a multiplexed set of uplink control messages associated with multiple communications between the first TRP and the UE, where the multiplexed set of uplink control messages includes the feedback information for the downlink data transmission, CSI feedback, SR, or a combination thereof.

The TRP identification component 835 may receive an indication of a TRP ID associated with the first TRP via a TRP indicator field in DCI of the first downlink grant. In some examples, the TRP identification component 835 may receive an indication of a TRP ID associated with the first TRP via the first CORESET, where a CORESET ID associated with the first CORESET indicates the TRP ID. In some examples, the TRP identification component 835 may receive an indication of a TRP ID associated with the first TRP via the first CORESET, where the first CORESET corresponds to the first TRP.

The uplink grant component 840 may receive an indication of a TRP ID associated with the first TRP via a TRP indicator field in DCI of a first uplink grant, where the first uplink grant schedules an uplink transmission from the UE to the first TRP.

The quasi co-locator 845 may identify a quasi co-location configuration. In some cases, each of the set of CORESETs is quasi co-located with a downlink RS transmitted from one TRP of the set of TRPs. In some cases, the resources associated with the first PUCCH configuration are quasi co-located with a first downlink RS from the first TRP. In some cases, the resources associated with the second PUCCH configuration are quasi co-located with a second downlink RS from the second TRP. In some cases, each PUCCH resource of the single PUCCH configuration is associated with a respective quasi co-location configuration. In some cases, each quasi co-location configuration (e.g., identified at the quasi co-locator 845) identifies a RS associated with one of the first TRP, or the second TRP. In some cases, each quasi co-location configuration corresponds to a power control loop index associated with one of the first TRP or the second TRP. In some examples, resources of the first subset of resources are quasi co-located with at least one first downlink RS associated with the first TRP and resources resource of the second subset of resources are quasi co-located with at least one second downlink RS associated with the second TRP.

The uplink control component 850 may determine an uplink control channel configuration for communication with the first TRP and a second TRP of the set of TRPs, where the uplink control channel configuration specifies a first PUCCH configuration for the first TRP and a second PUCCH configuration for the second TRP.

In some examples, the uplink control component 850 may determine an uplink control channel configuration for communication with the first TRP and a second TRP of the set of TRPs, where the uplink control channel configuration specifies a single PUCCH configuration for both the first TRP and the second TRP.

In some examples, the uplink control component 850 may determine a first PUCCH configuration for the first TRP and a second PUCCH configuration for a second TRP of the set of TRPs, where the first PUCCH configuration configures PUCCH resources in a first set of time intervals, and the second PUCCH configuration configures PUCCH resources in a second set of time intervals that is nonoverlapping with the first set of time intervals. In some cases, each of the first set of time intervals and each of the second set of time intervals is a slot or a mini-slot.

The power control component 855 may transmit the feedback information for the downlink data transmission to the first TRP in accordance with the first power control loop and transmit second feedback information for a second downlink data transmission to a second TRP in accordance with the second power control loop. In some cases, the first PUCCH configuration identifies a first power control loop, and the second PUCCH configuration identifies a second power control loop that is different from the first PUCCH configuration. In some cases, the feedback information for the data transmission is transmitted according to a power control loop different from the feedback information for the second data transmission.

The ACK/NACK component 860 may receive, from the first TRP, an indication of a feedback timing and feedback resource indicator for the first PUCCH. In some examples, the ACK/NACK component 860 may receive, from the second TRP, an indication of a feedback timing and feedback resource indicator for the second PUCCH.

The uplink data component 865 may transmit the feedback information for the data transmission to the first TRP via an uplink shared channel communication associated with the first TRP.

Figure 9:
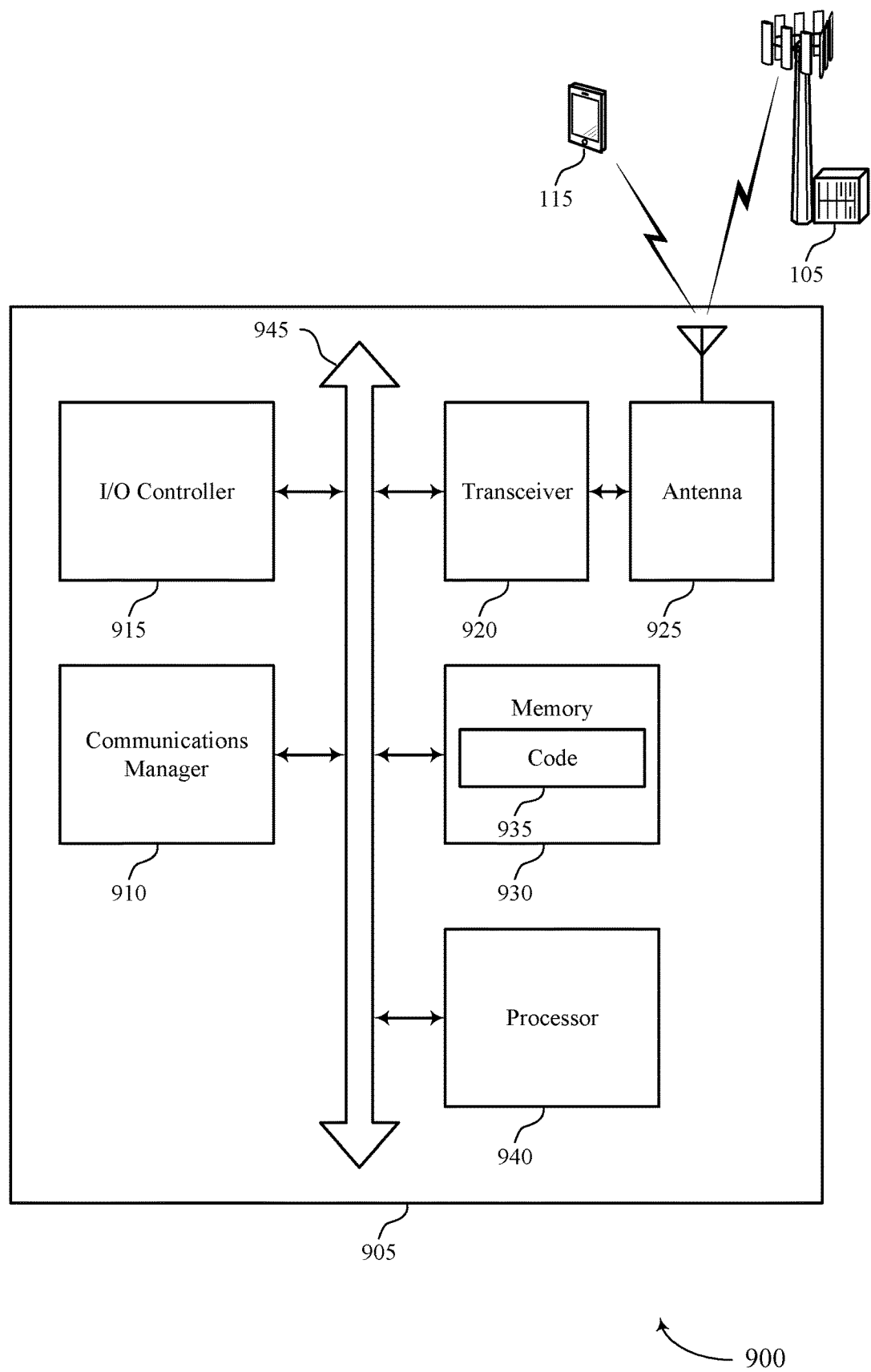
FIG. 9 shows a diagram of a system including a device that supports feedback for multi-point communications in accordance with aspects of the present disclosure.

FIG. 9 shows a diagram of a system 900 including a device 905 that supports feedback for multi-point communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, via a first CORESET of a set of CORESETs monitored by the UE, a first downlink grant that schedules a downlink data transmission to the UE, receive the downlink data transmission from a first TRP of a set of TRPs, and transmit feedback information for the downlink data transmission to the first TRP based on the first TRP being associated with the first CORESET or the first downlink grant being received via the first CORESET.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the device 905 may include a single antenna 925, or the device 905 may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting feedback for multi-point communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

FIG. 10 shows a block diagram 1000 of a device 1005 that supports feedback for multi-point communications in accordance with aspects of the present disclosure. The device 1005 may be an example of aspects of a TRP 105 (e.g., a base station 105) as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to feedback for multi-point communications). Information may be passed on to other components of the device 1005. The receiver 1010 may be an example of aspects of the transceiver 1320 described with reference to FIG. 13. The receiver 1010 may utilize a single antenna or multiple antennas.

The communications manager 1015 may transmit, via a first CORESET of a set of CORESETs associated with the set of TRPs for coordinating communication with a UE, a first downlink grant that schedules a downlink data transmission to the UE and receive feedback information for the downlink data transmission from the UE based on the first TRP being associated with the first CORESET or the first downlink grant being transmitted via the first CORESET. The communications manager 1015 may be an example of aspects of the communications manager 1310 described herein with reference to FIG. 13.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or multiple antennas.

Figure 11:
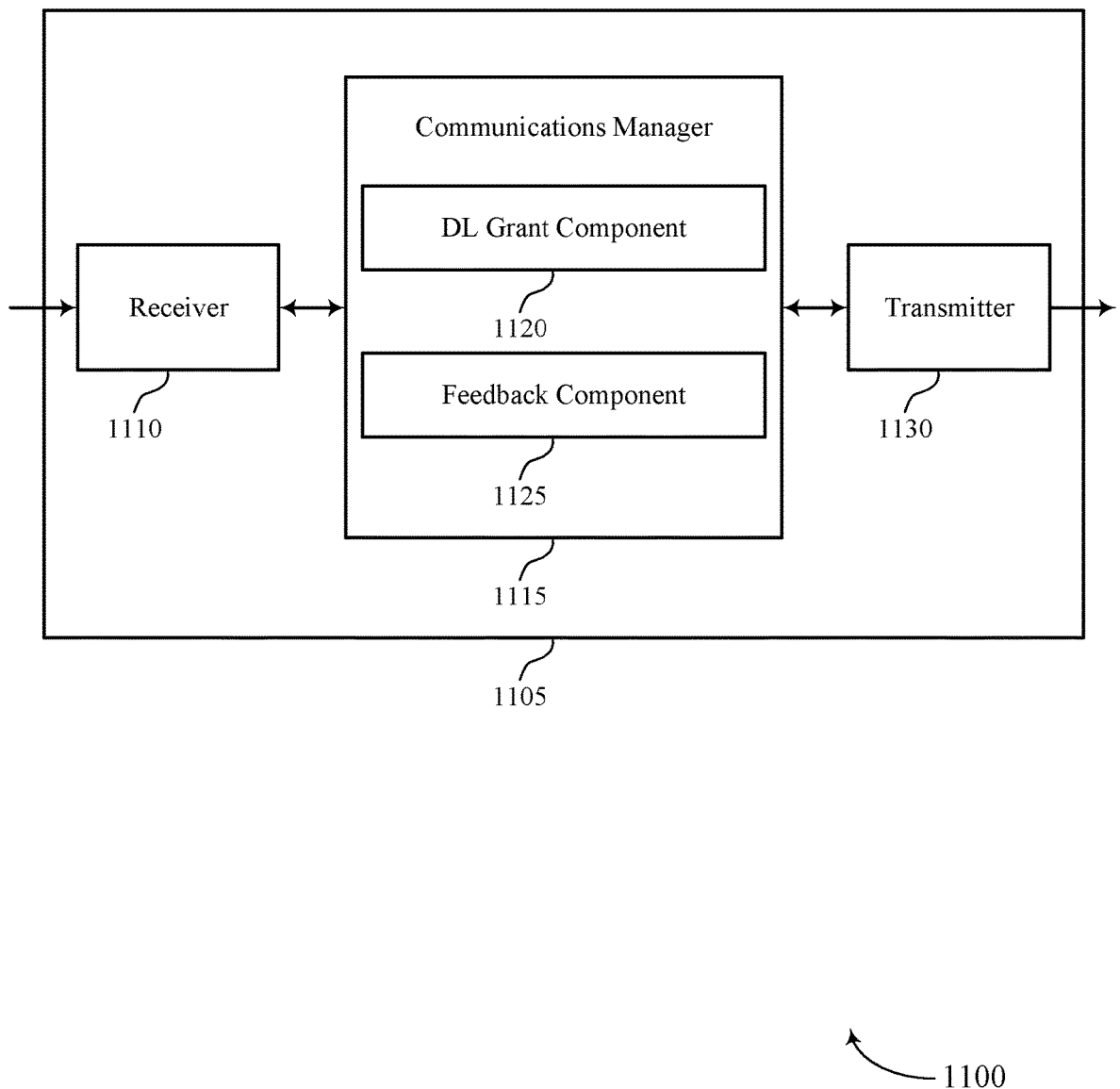

FIG. 11 shows a block diagram 1100 of a device 1105 that supports feedback for multi-point communications in accordance with aspects of the present disclosure. The device 1105 may be an example of aspects of a device 1005 or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to feedback for multi-point communications). Information may be passed on to other components of the device 1105. The receiver 1110 may be an example of aspects of the transceiver 1320 described with reference to FIG. 13. The receiver 1110 may utilize a single antenna or multiple antennas.

The communications manager 1115 may be an example of aspects of the communications manager 1015 as described herein. The communications manager 1115 may include a downlink grant component 1120 and a feedback component 1125. The communications manager 1115 may be an example of aspects of the communications manager 1310 described herein.

The downlink grant component 1120 may transmit, via a first CORESET of a set of CORESETs associated with the set of TRPs for coordinating communication with a UE, a first downlink grant that schedules a downlink data transmission to the UE. The feedback component 1125 may receive feedback information for the downlink data transmission from the UE based on the first TRP being associated with the first CORESET or the first downlink grant being transmitted via the first CORESET.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or multiple antennas.

Figure 12:
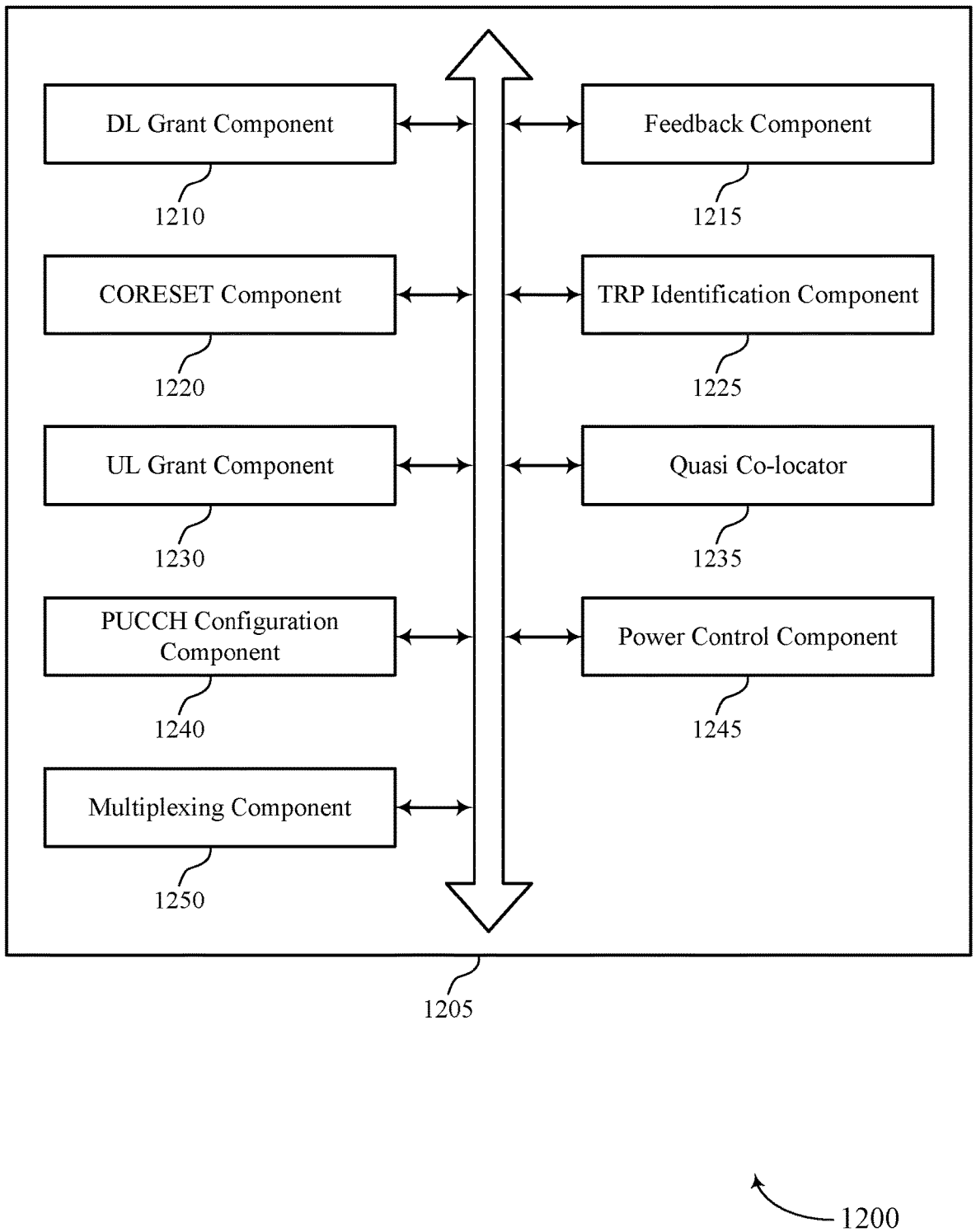
FIG. 12 shows a block diagram of a communications manager that supports feedback for multi-point communications in accordance with aspects of the present disclosure.

FIG. 12 shows a block diagram 1200 of a communications manager 1205 that supports feedback for multi-point communications in accordance with aspects of the present disclosure. The communications manager 1205 may be an example of aspects of a communications manager 1015, a communications manager 1115, or a communications manager 1310 described herein. The communications manager 1205 may include a downlink grant component 1210, a feedback component 1215, a CORESET component 1220, a TRP identification component 1225, an uplink grant component 1230, a quasi co-locator 1235, a PUCCH configuration component 1240, a power control component 1245, and a multiplexing component 1250. Each of these modules may communicate, directly or indirectly, with one another (e.g., via one or more buses).

The downlink grant component 1210 may transmit, via a first CORESET of a set of CORESETs associated with the set of TRPs for coordinating communication with a UE, a first downlink grant that schedules a downlink data transmission to the UE.

The feedback component 1215 may receive feedback information for the downlink data transmission from the UE based on the first TRP being associated with the first CORESET or the first downlink grant being transmitted via the first CORESET.

The CORESET component 1220 may transmit a configuration message configuring the UE to monitor the set of CORESETs, where the configuration message indicates that the first TRP is associated with the first CORESET.

In some examples, two CORESETs of the set of control resources sets are associated with one TRP of the set of TRPs. In some cases, the first CORESET corresponds to multiple TRPs of the set of TRPs. In some cases, the first CORESET is configured in a first cell supported by the first TRP. In some cases, the first CORESET is associated with a second CORESET supported by a second cell of the first TRP.

The TRP identification component 1225 may transmit an indication of a TRP ID associated with the first TRP via a TRP indicator field in DCI of the first downlink grant.

In some examples, the TRP identification component 1225 may transmit an indication of a TRP ID associated with the first TRP via the first CORESET, where a CORESET ID associated with the first CORESET indicates the TRP ID. In some examples, the TRP identification component 1225 may transmit an indication of a TRP ID associated with the first TRP via the first CORESET, where the first CORESET corresponds to the first TRP.

The uplink grant component 1230 may transmit an indication of a TRP ID associated with the first TRP via a TRP indicator field in DCI of a first uplink grant, where the first uplink grant schedules an uplink transmission from the UE to the first TRP.

The quasi co-locator 1235 may identify a quasi co-location configuration. In some cases, each of the set of CORESETs is quasi co-located with a downlink RS transmitted from one TRP of the set of TRPs. In some cases, the first PUCCH configuration is associated with a quasi co-location configuration different from the second PUCCH configuration. In some cases, each PUCCH resource of the single PUCCH configuration is associated with a respective quasi co-location configuration.

The PUCCH configuration component 1240 may configure the UE according to an uplink control channel configuration for communication with the first TRP and a second TRP of the set of TRPs, where the uplink control channel configuration specifies a first PUCCH configuration for the first TRP and a second PUCCH configuration for the second TRP.

In some examples, the PUCCH configuration component 1240 may configure the UE with a first PUCCH configuration for the first TRP and a second PUCCH configuration for a second TRP of the set of TRPs, where the first PUCCH configuration configures PUCCH resources in a first set of time intervals, and the second PUCCH configuration configures PUCCH resources in a second set of time intervals that is nonoverlapping with the first set of time intervals.

In some examples, the PUCCH configuration component 1240 may configure the UE according to an uplink control channel configuration for communication with the first TRP and a second TRP of the set of TRPs, where the uplink control channel configuration specifies a single PUCCH configuration for both the first TRP and the second TRP.

In some examples, the PUCCH configuration component 1240 may determine a subset of resources of the single PUCCH configuration for the first transmission based on coordination between the first TRP and the second TRP. In some cases, each of the first set of time intervals and each of the second set of time intervals is a slot or a mini-slot.

The power control component 1245 may identify a power control loop. In some cases, the first PUCCH configuration identifies a first power control loop, and the second PUCCH configuration identifies a second power control loop that is different from the first PUCCH configuration. In some cases, the first PUCCH configuration is associated with a power control loop different from the second PUCCH configuration.

The multiplexing component 1250 may transmit, via the first downlink grant, an indication of a number of feedback messages to multiplex in the feedback information, where the indication is conveyed via a DAI field in DCI.

In some examples, the multiplexing component may receive a multiplexed set of feedback messages associated with multiple communications between the first TRP and the UE, where the multiplexed set of feedback messages includes the feedback information for the data transmission. In some examples, the multiplexing component 1250 may receive a multiplexed set of uplink control messages associated with multiple communications between the first TRP and the UE, where the multiplexed set of uplink control messages includes the feedback information for the downlink data transmission, CSI feedback, SR, or a combination thereof.

Figure 13:
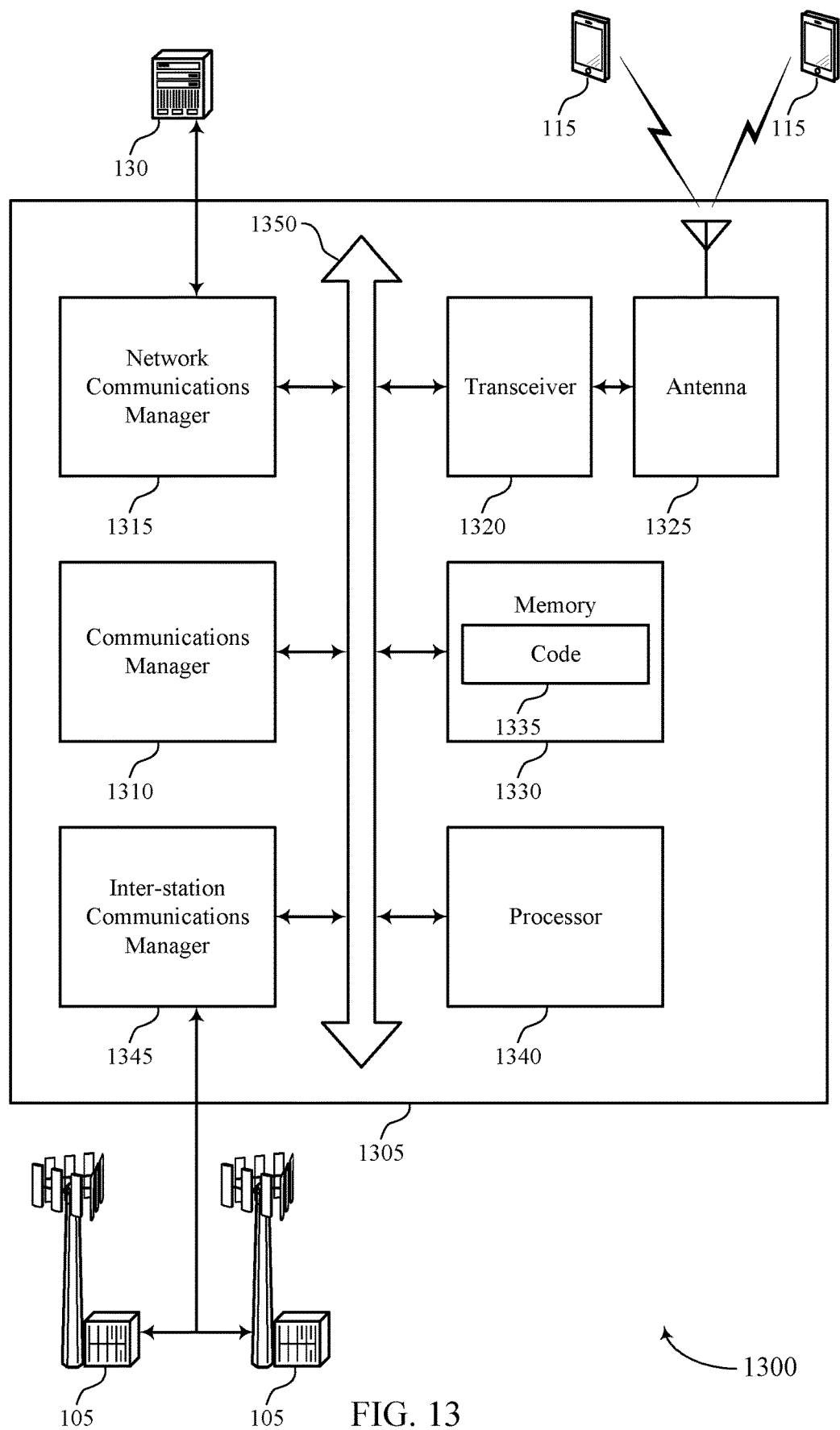
FIG. 13 shows a diagram of a system including a device that supports feedback for multi-point communications in accordance with aspects of the present disclosure.

FIG. 13 shows a diagram of a system 1300 including a device 1305 that supports feedback for multi-point communications in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, via a first CORESET of a set of CORESETs associated with the set of TRPs for coordinating communication with a UE, a first downlink grant that schedules a downlink data transmission to the UE and receive feedback information for the downlink data transmission from the UE based on the first TRP being associated with the first CORESET or the first downlink grant being transmitted via the first CORESET.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting feedback for multi-point communications).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
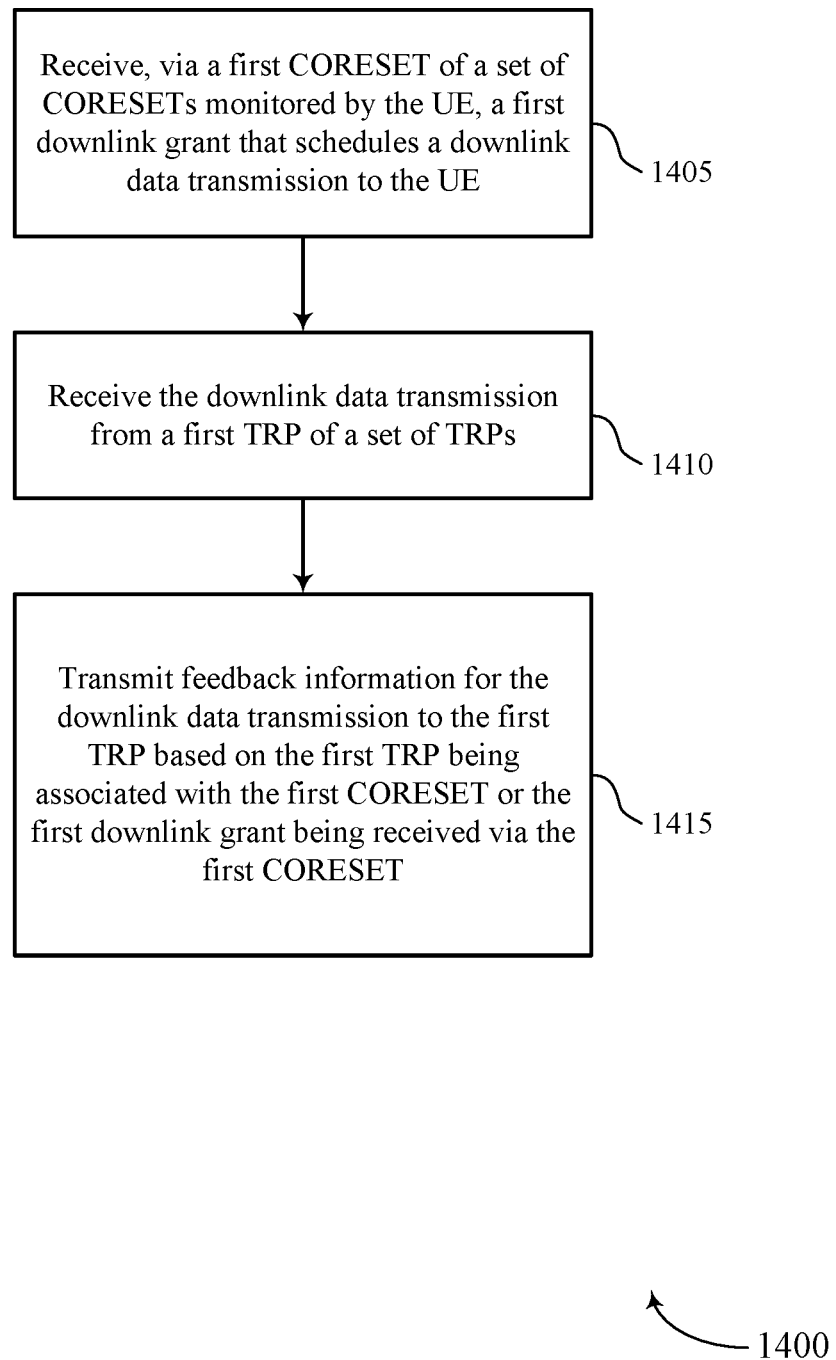
FIGS. 14 through 18 show flowcharts illustrating methods that support feedback for multi-point communications in accordance with aspects of the present disclosure.

FIG. 14 shows a flowchart illustrating a method 1400 that supports feedback for multi-point communications in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may receive, via a first CORESET of a set of CORESETs monitored by the UE, a first downlink grant that schedules a downlink data transmission to the UE. The operations of 1405 may be performed according to the methods described herein. In some examples, aspects of the operations of 1405 may be performed by a downlink grant component as described with reference to FIGS. 6 through 9.

At 1410, the UE may receive the downlink data transmission from a first TRP of a set of TRPs. The operations of 1410 may be performed according to the methods described herein. In some examples, aspects of the operations of 1410 may be performed by a data component as described with reference to FIGS. 6 through 9.

At 1415, the UE may transmit feedback information for the downlink data transmission to the first TRP based on the first TRP being associated with the first CORESET or the first downlink grant being received via the first CORESET. The operations of 1415 may be performed according to the methods described herein. In some examples, aspects of the operations of 1415 may be performed by a feedback component as described with reference to FIGS. 6 through 9.

Figure 15:
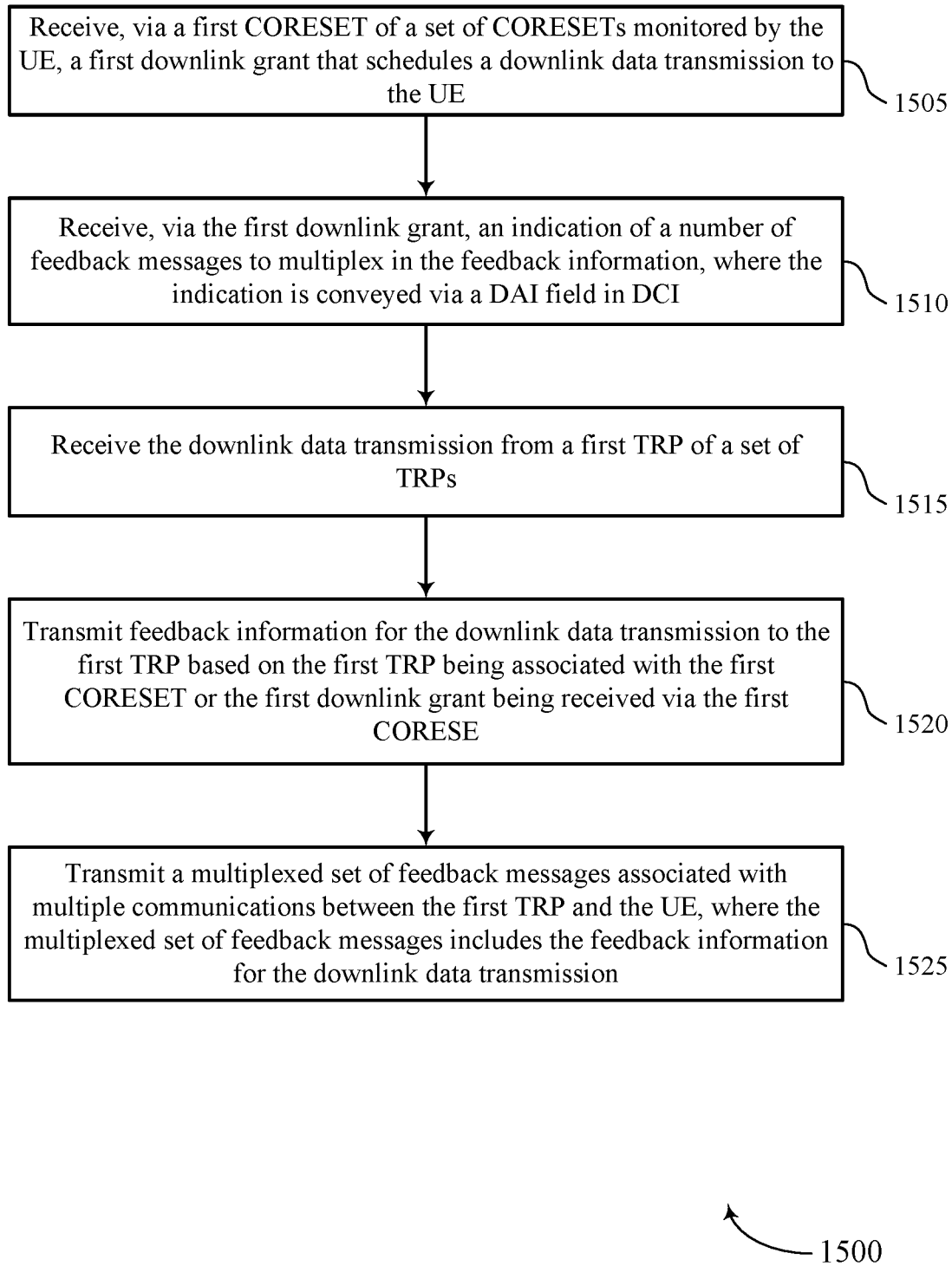

FIG. 15 shows a flowchart illustrating a method 1500 that supports feedback for multi-point communications in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may receive, via a first CORESET of a set of CORESETs monitored by the UE, a first downlink grant that schedules a downlink data transmission to the UE. The operations of 1505 may be performed according to the methods described herein. In some examples, aspects of the operations of 1505 may be performed by a downlink grant component as described with reference to FIGS. 6 through 9.

At 1510, the UE may receive, via the first downlink grant, an indication of a number of feedback messages to multiplex in the feedback information, where the indication is conveyed via a DAI field in DCI. The operations of 1510 may be performed according to the methods described herein. In some examples, aspects of the operations of 1510 may be performed by a multiplexing component as described with reference to FIGS. 6 through 9.

At 1515, the UE may receive the downlink data transmission from a first TRP of a set of TRPs. The operations of 1515 may be performed according to the methods described herein. In some examples, aspects of the operations of 1515 may be performed by a data component as described with reference to FIGS. 6 through 9.

At 1520, the UE may transmit feedback information for the downlink data transmission to the first TRP based on the first TRP being associated with the first CORESET or the first downlink grant being received via the first CORESET. The operations of 1520 may be performed according to the methods described herein. In some examples, aspects of the operations of 1520 may be performed by a feedback component as described with reference to FIGS. 6 through 9.

At 1525, the UE may transmit a multiplexed set of feedback messages associated with multiple communications between the first TRP and the UE, where the multiplexed set of feedback messages includes the feedback information for the downlink data transmission. The operations of 1525 may be performed according to the methods described herein. In some examples, aspects of the operations of 1525 may be performed by a multiplexing component as described with reference to FIGS. 6 through 9.

Figure 16:
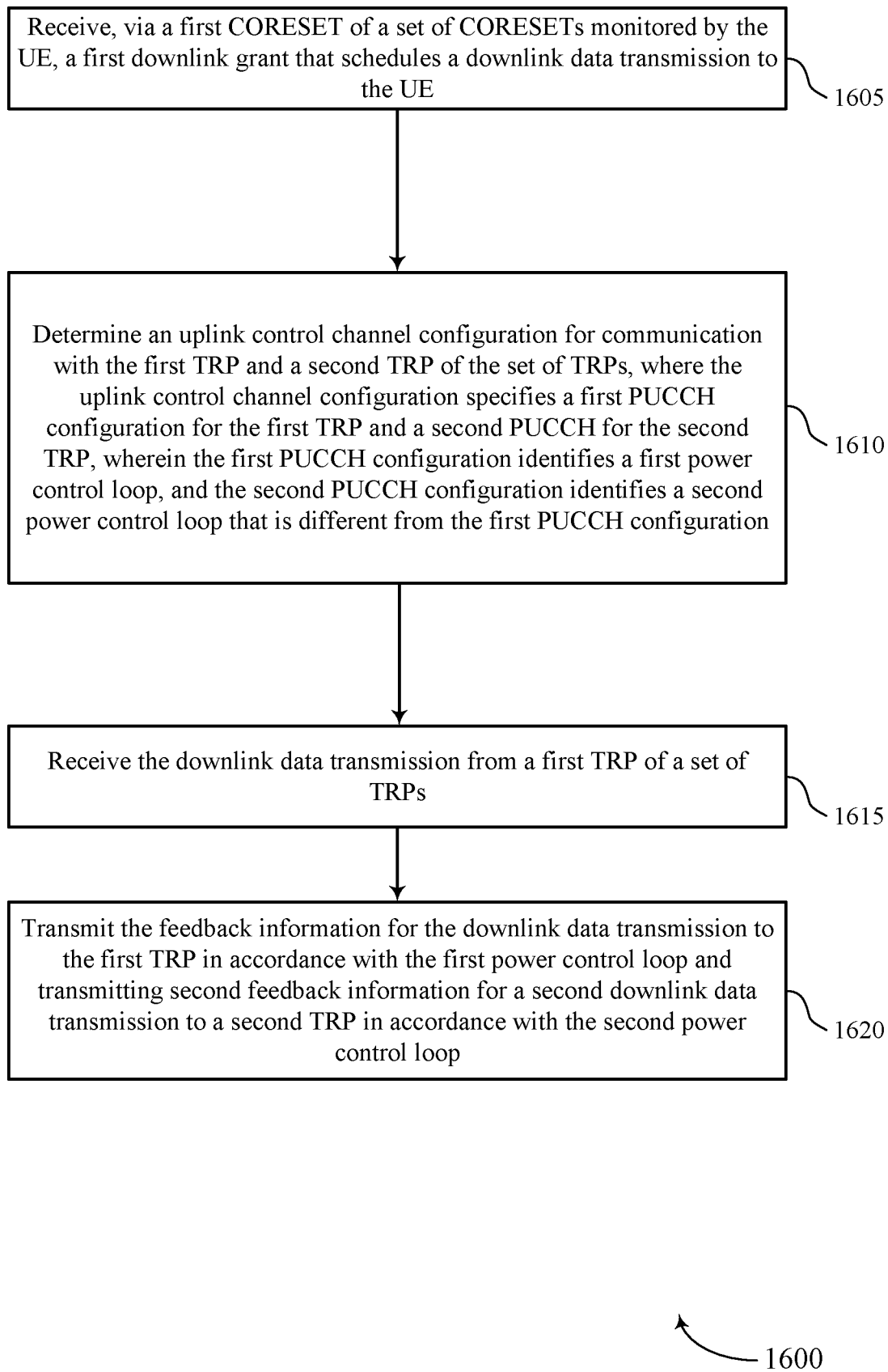

FIG. 16 shows a flowchart illustrating a method 1600 that supports feedback for multi-point communications in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may receive, via a first CORESET of a set of CORESETs monitored by the UE, a first downlink grant that schedules a downlink data transmission to the UE. The operations of 1605 may be performed according to the methods described herein. In some examples, aspects of the operations of 1605 may be performed by a downlink grant component as described with reference to FIGS. 6 through 9.

At 1610, the UE may determine an uplink control channel configuration for communication with the first TRP and a second TRP of the set of TRPs, where the uplink control channel configuration specifies a first PUCCH configuration for the first TRP and a second PUCCH configuration for the second TRP, where the first PUCCH configuration identifies a first power control loop, and the second PUCCH configuration identifies a second power control loop that is different from the first PUCCH configuration. The operations of 1610 may be performed according to the methods described herein. In some examples, aspects of the operations of 1610 may be performed by an uplink control component or a power control component as described with reference to FIGS. 6 through 9.

At 1615, the UE may receive the downlink data transmission from a first TRP of a set of TRPs. The operations of 1615 may be performed according to the methods described herein. In some examples, aspects of the operations of 1615 may be performed by a data component as described with reference to FIGS. 6 through 9.

At 1620, the UE may transmit the feedback information for the downlink data transmission to the first TRP in accordance with the first power control loop, and transmit second feedback information for a second downlink data transmission to a second TRP in accordance with the second power control loop. The operations of 1620 may be performed according to the methods described herein. In some examples, aspects of the operations of 1620 may be performed by a power control component as described with reference to FIGS. 6 through 9.

Figure 17:
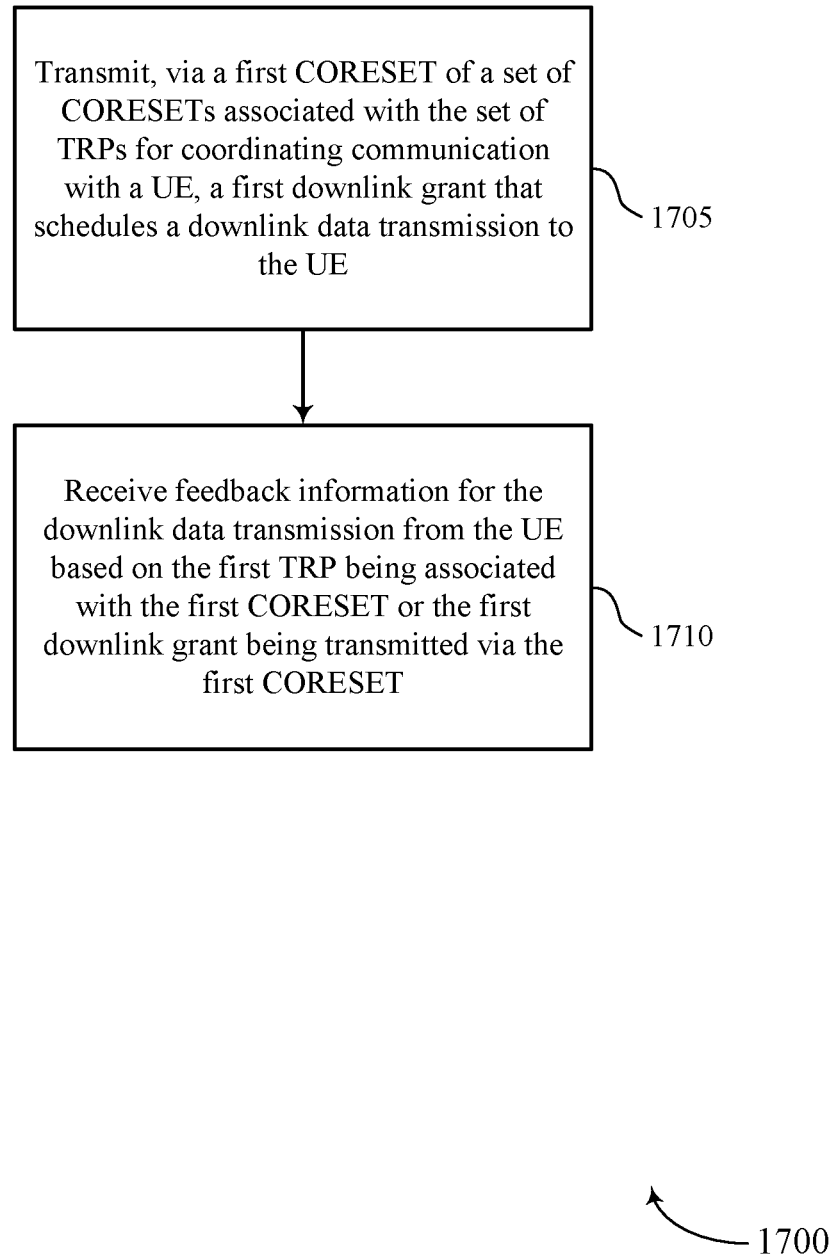

FIG. 17 shows a flowchart illustrating a method 1700 that supports feedback for multi-point communications in accordance with aspects of the present disclosure. The operations of method 1700 may be implemented by a base station 105 (e.g., a TRP 105) or its components as described herein. For example, the operations of method 1700 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1705, the base station may transmit, via a first CORESET of a set of CORESETs associated with the set of TRPs for coordinating communication with a UE, a first downlink grant that schedules a downlink data transmission to the UE. The operations of 1705 may be performed according to the methods described herein. In some examples, aspects of the operations of 1705 may be performed by a downlink grant component as described with reference to FIGS. 10 through 13.

At 1710, the base station may receive feedback information for the downlink data transmission from the UE based on the first TRP being associated with the first CORESET or the first downlink grant being transmitted via the first CORESET. The operations of 1710 may be performed according to the methods described herein. In some examples, aspects of the operations of 1710 may be performed by a feedback component as described with reference to FIGS. 10 through 13.

Figure 18:
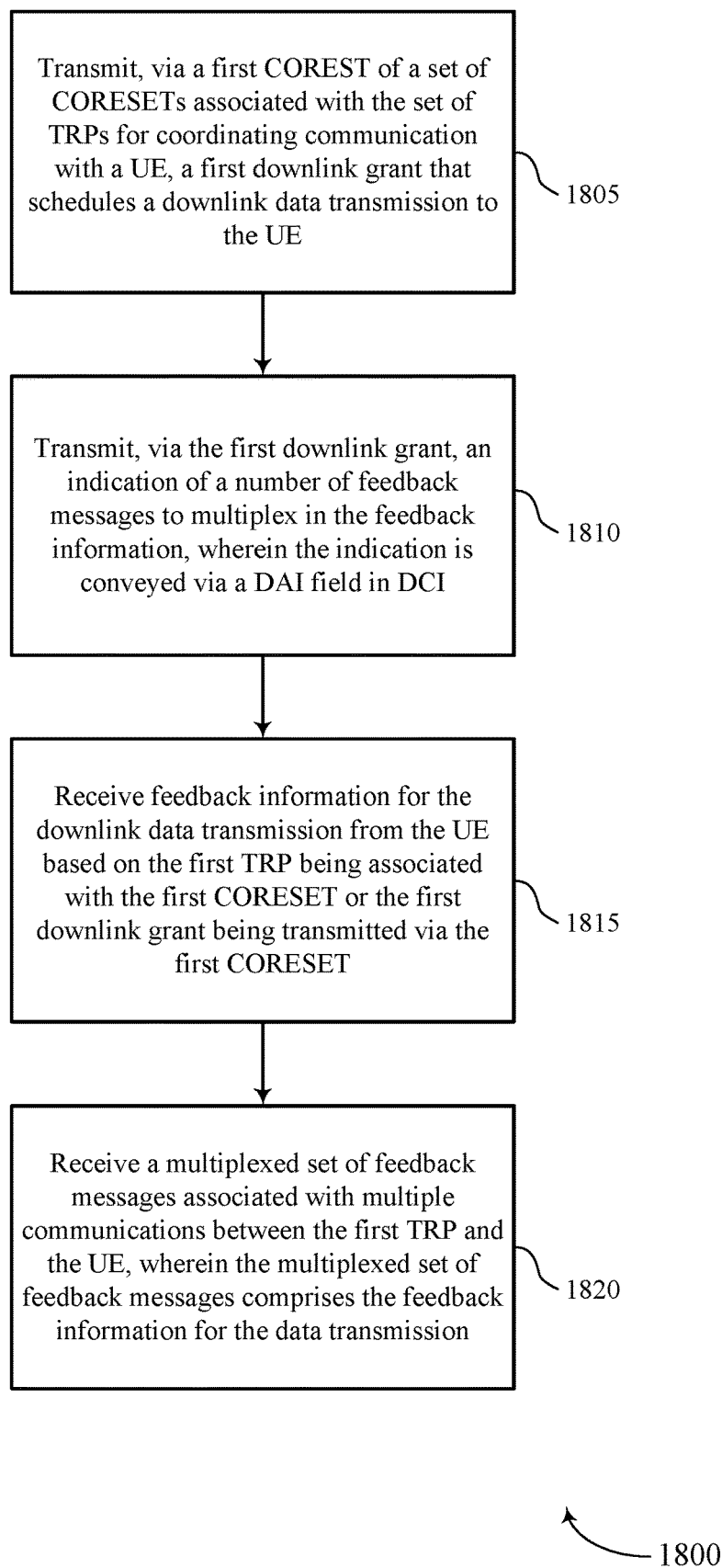

FIG. 18 shows a flowchart illustrating a method 1800 that supports feedback for multi-point communications in accordance with aspects of the present disclosure. The operations of method 1800 may be implemented by a base station 105 (e.g., a TRP 105) or its components as described herein. For example, the operations of method 1800 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1805, the base station may transmit, via a first CORESET of a set of CORESETs associated with the set of TRPs for coordinating communication with a UE, a first downlink grant that schedules a downlink data transmission to the UE. The operations of 1805 may be performed according to the methods described herein. In some examples, aspects of the operations of 1805 may be performed by a downlink grant component as described with reference to FIGS. 10 through 13.

At 1810, the base station may transmit, via the first downlink grant, an indication of a number of feedback messages to multiplex in the feedback information, where the indication is conveyed via a DAI field in DCI. The operations of 1810 may be performed according to the methods described herein. In some examples, aspects of the operations of 1810 may be performed by a multiplexing component as described with reference to FIGS. 10 through 13.

At 1815, the base station may receive feedback information for the downlink data transmission from the UE based on the first TRP being associated with the first CORESET or the first downlink grant being transmitted via the first CORESET. The operations of 1815 may be performed according to the methods described herein. In some examples, aspects of the operations of 1815 may be performed by a feedback component as described with reference to FIGS. 10 through 13.

At 1820, the base station may receive a multiplexed set of feedback messages associated with multiple communications between the first TRP and the UE, where the multiplexed set of feedback messages includes the feedback information for the downlink data transmission. The operations of 1820 may be performed according to the methods described herein. In some examples, aspects of the operations of 1820 may be performed by a multiplexing component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), FDMA, orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, via a first control resource set of a plurality of control resource sets monitored by the UE, a first downlink grant that schedules a first downlink data transmission to the UE and comprises a downlink assignment index (DAI) field indicating a number of feedback messages to multiplex in first feedback information;
   receiving, via a second control resource set of the plurality of control resource sets monitored by the UE, a second downlink grant that schedules a second downlink data transmission to the UE;
   receiving the first downlink data transmission from a first transmission reception point of a plurality of transmission reception points;
   receiving the second downlink data transmission from a second transmission reception point of the plurality of transmission reception points;
   transmitting the first feedback information for the first downlink data transmission to the first transmission reception point according to the DAI field based at least in part on the first transmission reception point being associated with the first control resource set or the first downlink grant being received via the first control resource set; and
   transmitting second feedback information for the second downlink data transmission to the second transmission reception point based at least in part on the second transmission reception point being associated with the second control resource set or the second downlink grant being received via the first control resource set.

2. The method of claim 1, wherein the DAI field is included in downlink control information (DCI).

3. The method of claim 1, wherein transmitting the first feedback information comprises:
   transmitting a multiplexed set of feedback messages associated with multiple communications between the first transmission reception point and the UE, wherein the multiplexed set of feedback messages comprises the first feedback information for the first downlink data transmission.

4. The method of claim 3, wherein the multiplexed set of feedback messages corresponds to a plurality of downlink grants received in the first control resource set.

5. The method of claim 1, wherein:
the first feedback information for the first downlink data transmission is transmitted via a first physical uplink control channel to the first transmission reception point according to a downlink assignment index (DAI) associated with the first downlink grant, wherein the DAI associated with the first downlink grant indicates a number of feedback messages corresponding to the first downlink grant received in the first control resource set; and
the second feedback information for the second downlink data transmission is transmitted via a second physical uplink control channel to the second transmission reception point according to a DAI associated with the second downlink grant, wherein the DAI associated the second downlink grant indicates a number of feedback messages corresponding to the second downlink grant received in the second control resource set.

6. The method of claim 5, further comprising:
receiving, from the first transmission reception point, an indication of a feedback timing and feedback resource indicator for the first physical uplink control channel, wherein transmitting the first feedback information is based at least in part on the receiving the indication.

7. The method of claim 5, further comprising:
receiving, from the second transmission reception point, an indication of a feedback timing and feedback resource indicator for the second physical uplink control channel, wherein transmitting the second feedback information is based at least in part on the receiving the indication.

8. The method of claim 1, wherein the first feedback information for the first downlink data transmission is transmitted according to a power control loop different from the second feedback information for the second downlink data transmission.

9. The method of claim 1, further comprising:
transmitting the first feedback information for the first downlink data transmission to the first transmission reception point via an uplink shared channel communication associated with the first transmission reception point, wherein the uplink shared channel is associated with the first transmission reception point based at least in part on an uplink grant for the uplink shared channel being received in the first control resource set.

10. The method of claim 1, further comprising:
transmitting the second feedback information for the second downlink data transmission to the second transmission reception point via an uplink shared channel communication associated with the second transmission reception point, wherein the uplink shared channel is associated with the second transmission reception point based at least in part on an uplink grant for the uplink shared channel being received in the second control resource set.

11. The method of claim 1, further comprising:
determining whether to drop at least a portion of the first feedback information for the first downlink data transmission or the second feedback information for the second downlink data transmission based at least in part on a set of priority rules, wherein the set of priority rules is based at least in part on an uplink control information type, a transmission reception point priority, or a starting symbol associated with transmission of the first feedback information or the second feedback information for the first downlink data transmission or the second downlink data transmission.

12. The method of claim 1, further comprising:
transmitting, via an uplink control channel, a multiplexed set of uplink control messages associated with multiple communications between the first transmission reception point and the UE, wherein the multiplexed set of uplink control messages comprises the first feedback information for the first downlink data transmission, channel state information (CSI) feedback, a scheduling request (SR), or a combination thereof.

13. An apparatus for wireless communications at a user equipment (UE), comprising:
a processor,
memory coupled with the processor; and
instructions stored in the memory and executable by the processor to cause the apparatus to:
receive, via a first control resource set of a plurality of control resource sets monitored by the UE, a first downlink grant that schedules a first downlink data transmission to the UE and comprises a downlink assignment index (DAI) field indicating a number of feedback messages to multiplex in first feedback information;
receive, via a second control resource set of the plurality of control resource sets monitored by the UE, a second downlink grant that schedules a second downlink data transmission to the UE;
receive the first downlink data transmission from a first transmission reception point of a plurality of transmission reception points;
receive the second downlink data transmission from a second transmission reception point of the plurality of transmission reception points;
transmit the first feedback information for the first downlink data transmission to the first transmission reception point according to the DAI field based at least in part on the first transmission reception point being associated with the first control resource set or the first downlink grant being received via the first control resource set; and
transmit second feedback information for the second downlink data transmission to the second transmission reception point based at least in part on the second transmission reception point being associated with the second control resource set or the second downlink grant being received via the first control resource set.

14. The apparatus of claim 13, wherein the DAI field is included in downlink control information (DCI).

15. The apparatus of claim 13, wherein the instructions to transmit the first feedback information are executable by the processor to cause the apparatus to:
transmit a multiplexed set of feedback messages associated with multiple communications between the first transmission reception point and the UE, wherein the multiplexed set of feedback messages comprises the first feedback information for the first downlink data transmission.

16. The apparatus of claim 15, wherein the multiplexed set of feedback messages corresponds to a plurality of downlink grants received in the first control resource set.

17. The apparatus of claim 13, wherein:
the first feedback information for the first downlink data transmission is transmitted via a first physical uplink control channel to the first transmission reception point according to a downlink assignment index (DAI) associated with the first downlink grant, wherein the DAI associated with the first downlink grant indicates a number of feedback messages corresponding to the first downlink grant received in the first control resource set; and the second feedback information for the second downlink data transmission is transmitted via a second physical uplink control channel to the second transmission reception point according to a DAI associated with the second downlink grant, wherein the DAI associated the second downlink grant indicates a number of feedback messages corresponding to the second downlink grant received in the second control resource set.

18. The apparatus of claim 17, wherein the instructions are further executable by the processor to cause the apparatus to:

receive, from the first transmission reception point, an indication of a feedback timing and feedback resource indicator for the first physical uplink control channel, wherein transmitting the first feedback information is based at least in part on the receiving the indication.

19. The apparatus of claim 17, wherein the instructions are further executable by the processor to cause the apparatus to:

receive, from the second transmission reception point, an indication of a feedback timing and feedback resource indicator for the second physical uplink control channel, wherein transmitting the second feedback information is based at least in part on the receiving the indication.

20. The apparatus of claim 13, wherein the first feedback information for the first downlink data transmission is transmitted according to a power control loop different from the second feedback information for the second downlink data transmission.

21. The apparatus of claim 13, wherein the instructions are further executable by the processor to cause the apparatus to:

transmit the first feedback information for the first downlink data transmission to the first transmission reception point via an uplink shared channel communication associated with the first transmission reception point, wherein the uplink shared channel is associated with the first transmission reception point based at least in part on an uplink grant for the uplink shared channel being received in the first control resource set.

22. The apparatus of claim 13, wherein the instructions are further executable by the processor to cause the apparatus to:

transmit the second feedback information for the second downlink data transmission to the second transmission reception point via an uplink shared channel communication associated with the second transmission reception point, wherein the uplink shared channel is associated with the second transmission reception point based at least in part on an uplink grant for the uplink shared channel being received in the second control resource set.

23. The apparatus of claim 13, wherein the instructions are further executable by the processor to cause the apparatus to:

determine whether to drop at least a portion of the first feedback information for the first downlink data transmission or the second feedback information for the second downlink data transmission based at least in part on a set of priority rules, wherein the set of priority rules is based at least in part on an uplink control information type, a transmission reception point priority, or a starting symbol associated with transmission of the first feedback information or the second feedback information for the first downlink data transmission or the second downlink data transmission.

24. The apparatus of claim 13, wherein the instructions are further executable by the processor to cause the apparatus to:

transmit, via an uplink control channel, a multiplexed set of uplink control messages associated with multiple communications between the first transmission reception point and the UE, wherein the multiplexed set of uplink control messages comprises the first feedback information for the first downlink data transmission, channel state information (CSI) feedback, a scheduling request (SR), or a combination thereof.

25. An apparatus for wireless communications at a user equipment (UE), comprising:

means for receiving, via a first control resource set of a plurality of control resource sets monitored by the UE, a first downlink grant that schedules a first downlink data transmission to the UE and comprises a downlink assignment index (DAI) field indicating a number of feedback messages to multiplex in first feedback information;

means for receiving, via a second control resource set of the plurality of control resource sets monitored by the UE, a second downlink grant that schedules a second downlink data transmission to the UE;

means for receiving the first downlink data transmission from a first transmission reception point of a plurality of transmission reception points;

means for receiving the second downlink data transmission from a second transmission reception point of the plurality of transmission reception points;

means for transmitting the first feedback information for the first downlink data transmission to the first transmission reception point according to the DAI field based at least in part on the first transmission reception point being associated with the first control resource set or the first downlink grant being received via the first control resource set; and means for transmitting second feedback information for the second downlink data transmission to the second transmission reception point based at least in part on the second transmission reception point being associated with the second control resource set or the second downlink grant being received via the first control resource set.

26. The apparatus of claim 25, wherein the DAI field is included in downlink control information (DCI).

27. The apparatus of claim 25, wherein the means for transmitting the first feedback information comprises:

means for transmitting a multiplexed set of feedback messages associated with multiple communications between the first transmission reception point and the UE, wherein the multiplexed set of feedback messages comprises the first feedback information for the first downlink data transmission.

28. The apparatus of claim 27, wherein the multiplexed set of feedback messages corresponds to a plurality of downlink grants received in the first control resource set.

29. The apparatus of claim 25, wherein:

the first feedback information for the first downlink data transmission is transmitted via a first physical uplink control channel to the first transmission reception point according to a downlink assignment index (DAI) associated with the first downlink grant, wherein the DAI associated with the first downlink grant indicates a number of feedback messages corresponding to the first downlink grant received in the first control resource set; and the second feedback information for the second downlink data transmission is transmitted via a second physical uplink control channel to the second transmission reception point according to a DAI associated with the second downlink grant, wherein the DAI associated the second downlink grant indicates a number of feedback messages corresponding to the second downlink grant received in the second control resource set.

30. A non-transitory computer-readable medium storing code for wireless communications at a user equipment (UE), the code comprising instructions executable by a processor to:

receive, via a first control resource set of a plurality of control resource sets monitored by the UE, a first downlink grant that schedules a first downlink data transmission to the UE and comprises a downlink assignment index (DAI) field indicating a number of feedback messages to multiplex in first feedback information;

receive, via a second control resource set of the plurality of control resource sets monitored by the UE, a second downlink grant that schedules a second downlink data transmission to the UE;

receive the first downlink data transmission from a first transmission reception point of a plurality of transmission reception points;

receive the second downlink data transmission from a second transmission reception point of the plurality of transmission reception points;

transmit the first feedback information for the first downlink data transmission to the first transmission reception point according to the DAI field based at least in part on the first transmission reception point being associated with the first control resource set or the first downlink grant being received via the first control resource set; and transmit second feedback information for the second downlink data transmission to the second transmission reception point based at least in part on the second transmission reception point being associated with the second control resource set or the second downlink grant being received via the first control resource set.

* * * * *